United States Patent
Antony et al.

(10) Patent No.: US 10,282,261 B2
(45) Date of Patent: May 7, 2019

(54) POOLED MEMORY HEARTBEAT IN SHARED MEMORY ARCHITECTURE

(71) Applicant: VMWARE, INC., Palo Alto, CA (US)

(72) Inventors: Jinto Antony, Bangalore (IN); Hariharan Jeyaraman Ganesan, Bangalore (IN); Saju Chengat, Bangalore (IN); Madhusudhanan Gangadharan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 257 days.

(21) Appl. No.: 15/335,467

(22) Filed: Oct. 27, 2016

(65) Prior Publication Data
US 2017/0364422 A1    Dec. 21, 2017

(30) Foreign Application Priority Data
Jun. 20, 2016    (IN) .............................. 201641021018

(51) Int. Cl.
G06F 11/00    (2006.01)
G06F 11/20    (2006.01)
G06F 11/07    (2006.01)

(52) U.S. Cl.
CPC .......... *G06F 11/203* (2013.01); *G06F 11/079* (2013.01); *G06F 11/0712* (2013.01); *G06F 11/0757* (2013.01); *G06F 2201/805* (2013.01); *G06F 2201/815* (2013.01); *G06F 2201/82* (2013.01)

(58) Field of Classification Search
CPC ........ H04L 43/10; H04L 43/50; G06F 11/203; G06F 11/0712; G06F 11/0757
See application file for complete search history.

(56) References Cited

U.S. PATENT DOCUMENTS 8,560,747 B1 * 10/2013 Tan .......................... G06F 9/526
                                                                   710/200
8,769,089 B2 * 7/2014 Griffith ............... G06F 11/3006
                                                                   709/224

(Continued)

OTHER PUBLICATIONS

Unknown, "Cloud Architecture Optimized for Software-Defined Structure", Intel Corporation, captured Jun. 6, 2016, http://www.intel.com/content/www/us/en/architecture-and-technology/intel-rack-scale-architecture.html, 9 pages.

(Continued)

*Primary Examiner* — Marc Duncan
*Assistant Examiner* — Jonathan D Gibson

(57) ABSTRACT

Examples provide a pooled memory heartbeat for virtual machine hosts. A virtual controller creates a pooled memory heartbeat file system in a shared memory partition of a pooled memory. An agent running on each host in a plurality of virtual machine hosts updates a heartbeat file at an update time interval to lock the heartbeat file. The lock indicates the heartbeat status for a given host is active. A master agent accesses the shared memory partition to check the heartbeat status of each host in the pooled memory file system. The heartbeat status is used to determine whether a host that has lost pooled memory access, is network isolated, or failed. If the pooled memory heartbeat status for a given host indicates the host is a failed host, the set of virtual machines running on the given host are respawned on another healthier host.

17 Claims, 16 Drawing Sheets

(56) References Cited

U.S. PATENT DOCUMENTS

| | | | | |
|---|---|---|---|---|
| 9,485,163 | B1* | 11/2016 | Fries | G06F 11/202 |
| 2004/0039774 | A1* | 2/2004 | Xu | H04L 69/16 |
| | | | | 709/203 |
| 2008/0162983 | A1* | 7/2008 | Baba | G06F 11/0712 |
| | | | | 714/3 |
| 2008/0189700 | A1* | 8/2008 | Schmidt | G06F 11/203 |
| | | | | 718/1 |
| 2010/0017409 | A1* | 1/2010 | Rawat | G06F 17/30171 |
| | | | | 707/E17.007 |
| 2010/0211829 | A1* | 8/2010 | Ziskind | G06F 11/0709 |
| | | | | 714/48 |
| 2011/0179082 | A1* | 7/2011 | Vaghani | G06F 17/30008 |
| | | | | 707/781 |
| 2012/0030670 | A1* | 2/2012 | Vijay | G06F 9/45558 |
| | | | | 718/1 |
| 2012/0117241 | A1* | 5/2012 | Witt | G06F 17/30 |
| | | | | 709/226 |
| 2012/0278801 | A1* | 11/2012 | Nelson | G06F 9/45533 |
| | | | | 718/1 |
| 2015/0033072 | A1* | 1/2015 | Barr | G06F 11/1438 |
| | | | | 714/15 |
| 2017/0054617 | A1* | 2/2017 | Cropper | G06F 9/5083 |

OTHER PUBLICATIONS

J. Kumar, "Rack Scale Architecture—Platform and Management", Intel Corporation, Copyright 2014, 46 pages.

\* cited by examiner

| | NETWORKING HEARTBEAT 1402 | POOLED MEMORY HEARTBEAT 1404 | SHARED STORAGE HEARTBEAT 1406 | HOST STATUS DEDUCTION 1408 | REACTION BY AGENT 1410 |
|---|---|---|---|---|---|
| CASE 1 1412 | NO | NO | NO | HOST FAILED OR CRASHED | RESTART VMs ON HEALTHIER HOST. |
| CASE 2 1414 | NO | YES | YES | OPERATIONAL HOST ISOLATED OR PARTITIONED | RESUME VMs ON HEALTHIER HOST BASED ON USER SELECTED OPTION. |
| CASE 3 1416 | NO | YES | NO | HOST ISOLATED AND LOST STORAGE CONNECTIVITY | RESUME VMs ON HEALTHIER HOST BASED ON USER SELECTED OPTION. |
| CASE 4 1418 | YES | NO | NO | HOST LOST POOLED MEMORY AND LOST STORAGE CONNECTIVITY | RESTART VMs USING LOCAL MEMORY IF IT IS RESIDING ON POOLED MEMORY AND ON THE HOST WHERE STORAGE IS ACCESSIBLE. |
| CASE 5 1420 | NO | NO | YES | HOST LOST POOLED MEMORY AND ISOLATED | RESTART VMs ON LOCAL MEMORY IF IT IS RESIDING ON POOLED MEMORY. |
| CASE 6 1422 | YES | YES | NO | OPERATIONAL HOST LOST STORAGE CONNECTIVITY | RESTART VMs ON HEALTHIER HOST WHERE STORAGE IS ACCESSIBLE. |
| CASE 7 1424 | YES | NO | YES | OPERATIONAL HOST LOST POOLED MEMORY | RESTART VMs ON LOCAL MEMORY IF IT IS RESIDING ON POOLED MEMORY. |
| CASE 8 1426 | YES | YES | YES | HOST STATUS NORMAL | NO ACTION REQUIRED. |

*FIG. 14*

POOLED MEMORY HEARTBEAT IN SHARED MEMORY ARCHITECTURE

RELATED APPLICATIONS

Benefit is claimed under 35 U.S.C. 119(a)-(d) to Foreign application Serial No. 201641021018 filed in India entitled "POOLED MEMORY HEARTBEAT IN SHARED MEMORY ARCHITECTURE", on Jun. 20, 2016, by VMware, Inc., which is herein incorporated in its entirety by reference for all purposes.

The present application is related in subject matter to U.S. patent application Ser. No. 15/335,475, which is incorporated herein by reference.

BACKGROUND

In a high availability (HA) cluster of virtual machine hosts, an HA agent running inside a host needs to know whether a given host is crashed or merely isolated when there is a network disconnection of the given host from the rest of the hosts in the cluster. If the host has crashed, the virtual machines running on the host are restarted on another host. This process is time consuming and does not maintain the state of the virtual machines. However, if the host has merely lost network connection, the virtual machines can continue to run on the isolated host until the network connection is re-established.

It is difficult to determine if a host is still running after a loss of network connectivity with other hosts. An HA agent may be used to check shared data store for the given host heartbeat after a loss of network connectivity. If the data store heartbeat is inactive, the host is presumed to be crashed. However, a host that is network isolated may also become disconnected from the shared data store. In such cases, the host may be considered failed when it is still operational and only temporarily network isolated, resulting in unnecessary virtual machine restarts and unnecessary consumption of cluster resources restarting virtual machines that were still running on their original host.

SUMMARY

One example provides a method for monitoring pooled memory heartbeats to determine host status. A heartbeat file stored in at least one shared partition on the pooled memory is checked. The heartbeat file associated with a selected host in a plurality of virtual machine host computing devices. On determining the pooled memory heartbeat file is locked, a pooled memory heartbeat status of the selected host is identified as an active pooled memory heartbeat. On determining the pooled memory heartbeat file is unlocked, the pooled memory heartbeat status is identified as an inactive pooled memory heartbeat, the inactive pooled memory heartbeat indicates the selected host lost pooled memory connection.

BRIEF DESCRIPTION OF THE DRAWINGS

FIG. 14 is a heartbeat status deduction table.

Corresponding reference characters indicate corresponding parts throughout the drawings.

DETAILED DESCRIPTION

Examples described herein provide a pooled memory heartbeat for determining whether a host is isolated or failed. In some examples, each host in a cluster includes an agent. The agent creates a pooled memory heartbeat file in pooled memory and updates the pooled memory heartbeat file at regular intervals to maintain a lock on the pooled memory heartbeat file. In this manner, the agent on the host indicates that the host is still operational and continues to have access to the pooled memory. All hosts have connectivity to the pooled memory enabling one host to determine the status of another host by simply checking the pooled memory heartbeat file for the other host. This enables more accurate determinations as to whether a host is an operational host that lost network connectivity or a crashed host that is no longer operational. This reduces or eliminates inaccurate identifications of a host as a failed host when the host is actually still running.

In some examples, a master agent on at least one host in the cluster of virtual machine hosts monitors the pooled memory heartbeat status of other hosts in the cluster. The master agent in some examples monitors heartbeat status by checking the pooled memory heartbeat file for each host in the pooled memory. The heartbeat file in pooled memory is accessible by all hosts in the cluster. This increases the speed with which host status is determined.

If a heartbeat file is locked, the host associated with that heartbeat file is an active host. In some examples, if the heartbeat file is unlocked, the master agent identifies the host associated with the heartbeat file as an inactive or failed host. This pooled memory heartbeat monitoring reduces or eliminates unnecessary virtual machine restarts or respawns to improve virtual machine performance, reduce usage of physical memory, improve resource allocation, and enable more efficient use of system resources.

The pooled memory downtime for the shared memory pool is small compared to networking and storage. Thus, the pooled memory heartbeat provided in some examples enables greater reliability and accuracy of host heartbeat monitoring and host operational status determinations. The pooled memory heartbeat further reduces an error rate in host failure determinations.

Figure 1:
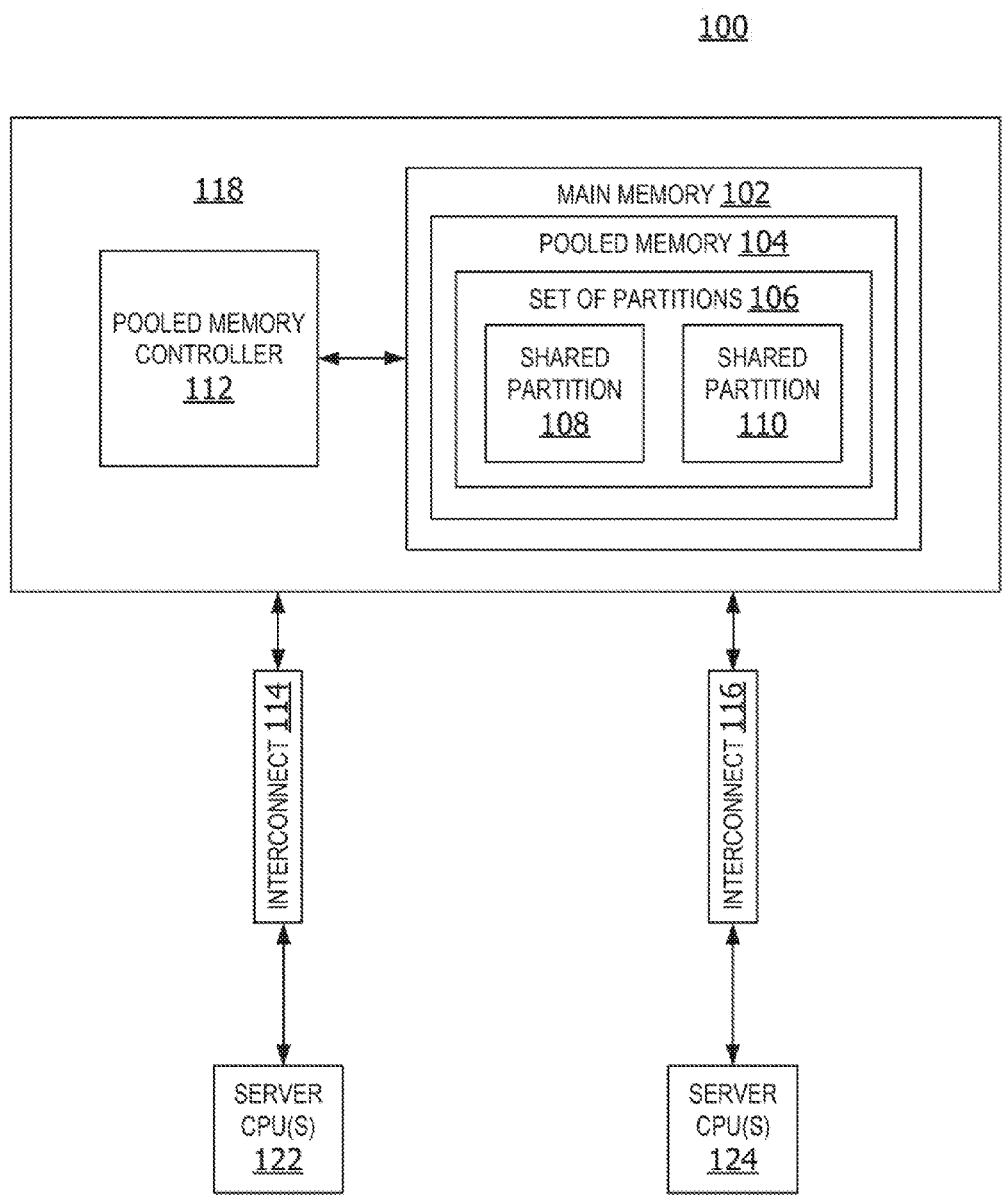
FIG. 1 is a block diagram of a shared memory architecture for a cluster of virtual machine hosts.

FIG. 1 is a block diagram of a shared memory architecture for a cluster of virtual machine hosts. The shared memory architecture 100 is a logical architecture that disaggregates memory and allows pooling of memory resources for more efficient utilization of memory. The shared memory architecture 100 in this non-limiting example utilizes server side dual in-line memory (DIMMs) and/or non-volatile dual in-line memory (NVDIMMs) to create a disaggregated memory pool. The memory pools are divided into one or more shared memory pools and one or more dedicated memory pools.

In some non-limiting examples, the shared memory architecture is implemented in a Rack Scale Architecture (RSA). An RSA disaggregates storage, compute, and network resources. An RSA permits pooling of resources for more efficient utilization of assets. An RSA may also be utilized to simplify resource management dynamically allocate resources based on workload-specific demands. One non-limiting example of an RSA includes, but is not limited to, an INTEL Rack Scale Architecture.

In some non-limiting examples, the shared memory architecture 100 utilizes INTEL RSA PCIe for connections between nodes to the top-of-the-rack switch. In this example, the network and storage connections terminate at the top-of-the-rack switch with the traffic being sent to each node over the PCIe interconnects. In this case, if the connection from a node to the switch is dead, both the shared memory and the shared storage/network channels will also be down. In other words, the correlation between failures on the shared pooled memory and the network/storage are likely to be non-trivial in this example.

In this non-limiting example, the memory 102 is implemented in physical random access memory (RAM). The memory 102 may be referred to as main memory. The memory includes pooled memory 104. The pooled memory 104 is shared memory accessible by all server hosts in the cluster of virtual machine hosts connected to the pooled memory 104. The pooled memory 104 enables memory sharing between different hosts within a virtual machine host cluster.

In other examples, RSA is only used between servers within a single rack. In this example, the shared pooled memory cannot be created between random servers in a datacenter. In other words, the pooled memory in these examples is only created between servers within the rack.

A set of partitions 106 may be provisioned on the pooled memory 104. As used herein, the term "set" refers to one or more, unless defined otherwise herein. In this example, the set of partitions 106 includes a set of one or more memory partitions. A partition in the set of partitions may be a per host partition or a shared partition. A shared partition is a partition that is accessible by two or more hosts in a cluster. In some examples, the shared partition is accessible by all hosts in the cluster. In this example, shared partition 108 and shared partition 110 are memory partitions that are accessible by more than one host in the cluster.

A shared partition may be utilized to store data generated or updated by a single host, a single virtual machine, two or more hosts, as well as two or more virtual machines. In other words, a shared partition that is accessible by multiple different hosts may be locked so as to permit only one host or one virtual machine to generate, update, or otherwise alter data stored in the shared partition.

In this example, the pooled memory includes two shared memory partitions. However, in other examples, the pooled memory may include a single shared partition, no shared partitions, as well as three or more shared partitions.

The pooled memory architecture 118 includes a pooled memory controller 112. The pooled memory controller 112 is a component for managing the pooled RAM. The pooled memory controller in this non-limiting example manages the set of partitions 104 and allocates memory to entities, such as, but not limited to, hosts and/or virtual machines.

In this example, the main memory 102 is shared by all processors associated with the cluster, such as set of processors. In this example, the set of processors includes server central processing units (CPUs) 122 and 124. The server CPUs access the main memory 102 via one or more interconnects, such as interconnect 114 and/or interconnect 116. This non-limiting example includes two server CPUs and two interconnects. However, other examples include any number of server CPUs and interconnects. For example, the shared memory architecture 100 may include three or more server CPUs.

Figure 2:
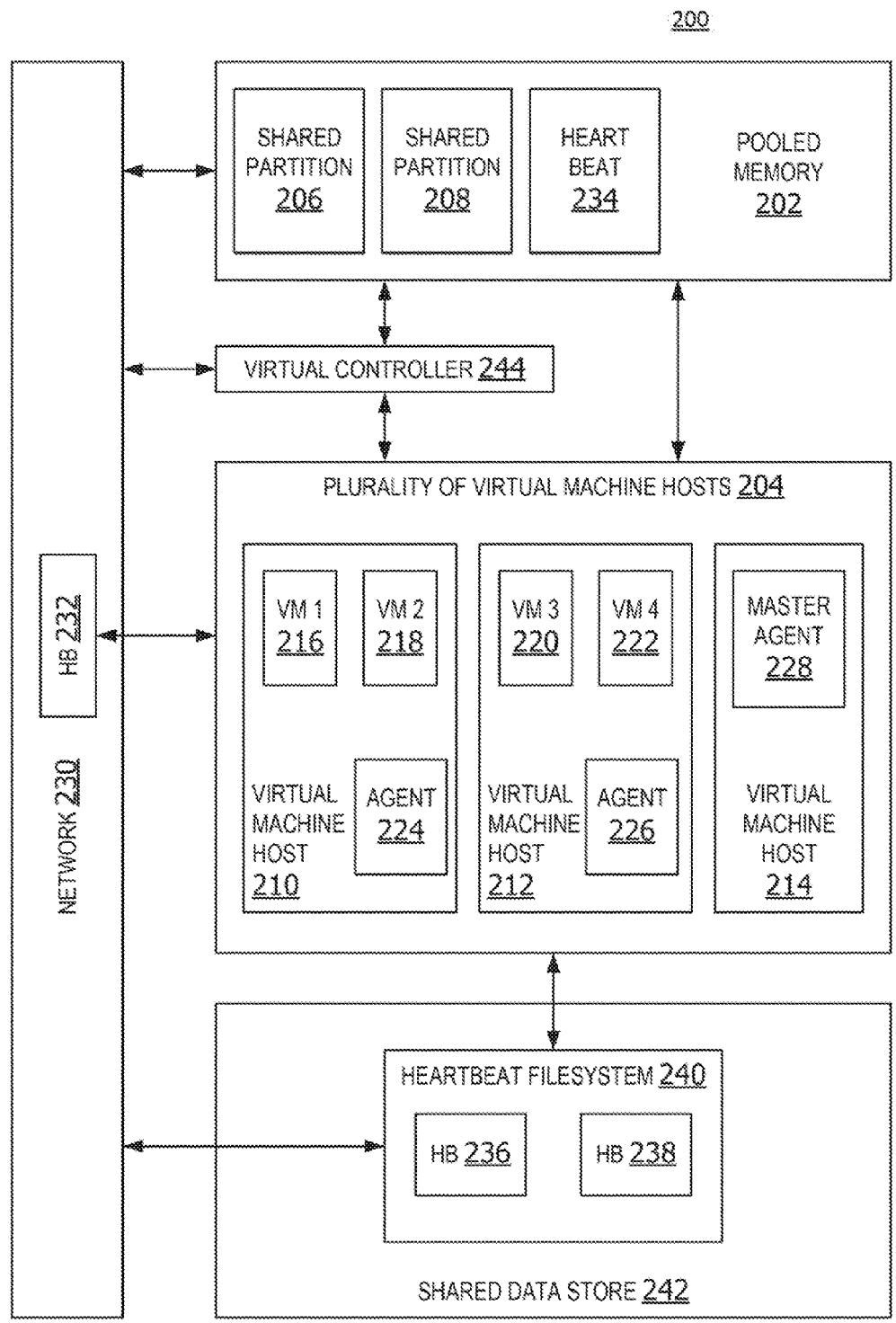
FIG. 2 is a block diagram illustrating heartbeat monitoring in a shared memory architecture.

FIG. 2 is a block diagram illustrating heartbeat monitoring in a shared memory architecture. The shared memory architecture 200 in this example includes at least one shared partition in the pooled memory 202 for heartbeat monitoring of one or more hosts in a plurality of virtual machine hosts 204.

The pooled memory 202 includes one or more shared partitions, such as shared partition 206 and shared partition 208. In this example, the pooled memory also includes a shared memory partition in the pooled memory 202 for heartbeat communication between all the hosts in the plurality of virtual machine hosts 204 in a cluster of virtual machine hosts.

The plurality of virtual machine hosts 204 is a set of two or more servers capable of hosting one or more virtual machines. A virtual machine host may be referred to as a node, a host, a server, a host server, a host computing device, or a cluster server. In some non-limiting examples, each host in the plurality of virtual machine hosts is a blade server within a RSA. In other examples, a host is implemented as Elastic Sky X (ESX) or ESXi host from VMware, Inc.

In this example, the plurality of virtual machine hosts 204 includes three hosts, virtual machine host 210, virtual machine host 212, and virtual machine host 214. In other examples, the plurality of virtual machine hosts includes only two hosts, as well as four or more hosts.

Each host is capable of serving one or more virtual machines. In this example, virtual machine host 210 serves virtual machine (VM 1) 216 and virtual machine (VM 2) 218. The virtual machine host 212 serves virtual machine (VM 3) 220 and virtual machine (VM4) 222. In this example, hosts 212 and 214 serve two virtual machines. However, in other examples, a virtual machine host may be serving a single virtual machine, three or more virtual machines, as well as no virtual machines.

An agent runs inside each host. The agent uses heartbeat data to monitor hosts and determine a current host operational status. An operational status includes a network isolation of the host, a lost pooled memory connection, a lost shared data store connection, or a failed host status. In this example, agent 224 runs inside virtual machine host 210, agent 226 runs inside virtual machine host 212, and master agent 228 runs on virtual machine host 214. In some examples, the agent is a high availability (HA) agent.

The plurality of virtual machine hosts 204 are connected to each other via a network 230. The hosts send and receive network heartbeat packages via the network 230. In some examples, each agent on each host sends a network heartbeat 232 signal to the other hosts over the network 230 at a predetermined interval. The predetermined interval is any time interval selected by a user, administrator, or default interval.

In some examples, the master agent 228 monitors the network heartbeat for all hosts in the plurality of hosts. If the master agent 228 fails to receive a network heartbeat from a given host in the plurality of hosts within a predetermined time period since the last network heartbeat was received from the given host, the master agent 228 identifies the given host as a network isolated host. The master agent 228 then determines whether the host is an isolated host or a failed host based on a pooled memory heartbeat 234.

The pooled memory heartbeat 234 is a host heartbeat shared through pooled memory 202. In some examples, the pooled memory heartbeat 234 is a pooled memory heartbeat file associated with virtual machine host 210. The agent 224 updates the pooled memory heartbeat file at regular intervals to maintain a lock on the file. The master agent 228 checks the pooled memory heartbeat 234 at regular intervals to determine if the file is locked. If the heartbeat file is unlocked, the master agent 228 identifies the host 210 associated with the pooled memory heartbeat 234 as a host that has lost access to the pooled memory. If the master agent 228 has failed to receive a network heartbeat 232 from the virtual machine host 210, the master agent in some examples identifies the host 210 as a failed host.

In still other examples, even if the host 210 has an inactive pooled memory heartbeat and an inactive network heartbeat, the master agent 228 does not identify the host as a failed host unless the host also has an inactive data store heartbeat, such as data store heartbeat 236 or heartbeat 238 in data store heartbeat filesystem 240 on shared data store 242. The shared data store 242 is a data store that is accessible by all hosts in the cluster of hosts. The cluster of hosts is a cluster of servers. The shared data store 242 may include databases, filesystem, files, or other collections of data.

In this example, each agent running on each host in the plurality of virtual machine hosts updates a heartbeat file associated with each host at regular intervals. For example, the agent 224 updates the heartbeat 236 file for virtual machine host 210 at regular intervals to maintain a lock on the heartbeat 236 file. If the agent 224 fails to update the heartbeat file within a predetermined period of time, the shared data store heartbeat file is unlocked indicating that the host 210 has an inactive data store heartbeat.

In some examples, if the network heartbeat 232, the pooled memory heartbeat 234, and the shared data store heartbeat 236 for host 210 are all inactive, the master agent identifies the host 210 as a failed host. A failed host may also be referred to as a crashed host. If a host is identified as a failed host, the master agent in some examples triggers respawn or resume of the virtual machines running on the failed host onto another host in the cluster. In other words, rather than restart the VM on another host, the VM is respawned on the new host using the pooled memory to maintain VM state. For example, if host 210 fails, the virtual machines 216 and 218 are respawned on another host, such as virtual machine host 212.

In some examples, the virtual machines running on a failed host are respawned on a new host using virtual machine memory stored on the pooled memory. In these examples, a virtual machine memory is maintained in a shared partition, such as shared partition 206. If the host fails, the virtual machine is respawned on a new host. The new host accesses the virtual machine's memory on the shared partition in pooled memory. In this manner, a virtual machine is respawned or resumed on a new host while maintaining a memory state of the virtual machine.

In other examples, the shared memory architecture includes a virtual controller 244. The virtual controller 244 in some examples is a component for managing multiple hosts and virtual machines, creating shared memory partitions for hosts, such as shared partition 206 and shared partition 208. The virtual controller 244 provisions a shared memory partition for the pooled memory heartbeat of each host. In some non-limiting examples, the virtual controller is implemented as VirtualCenter (vCenter) server from VMware, Inc.

Figure 3:
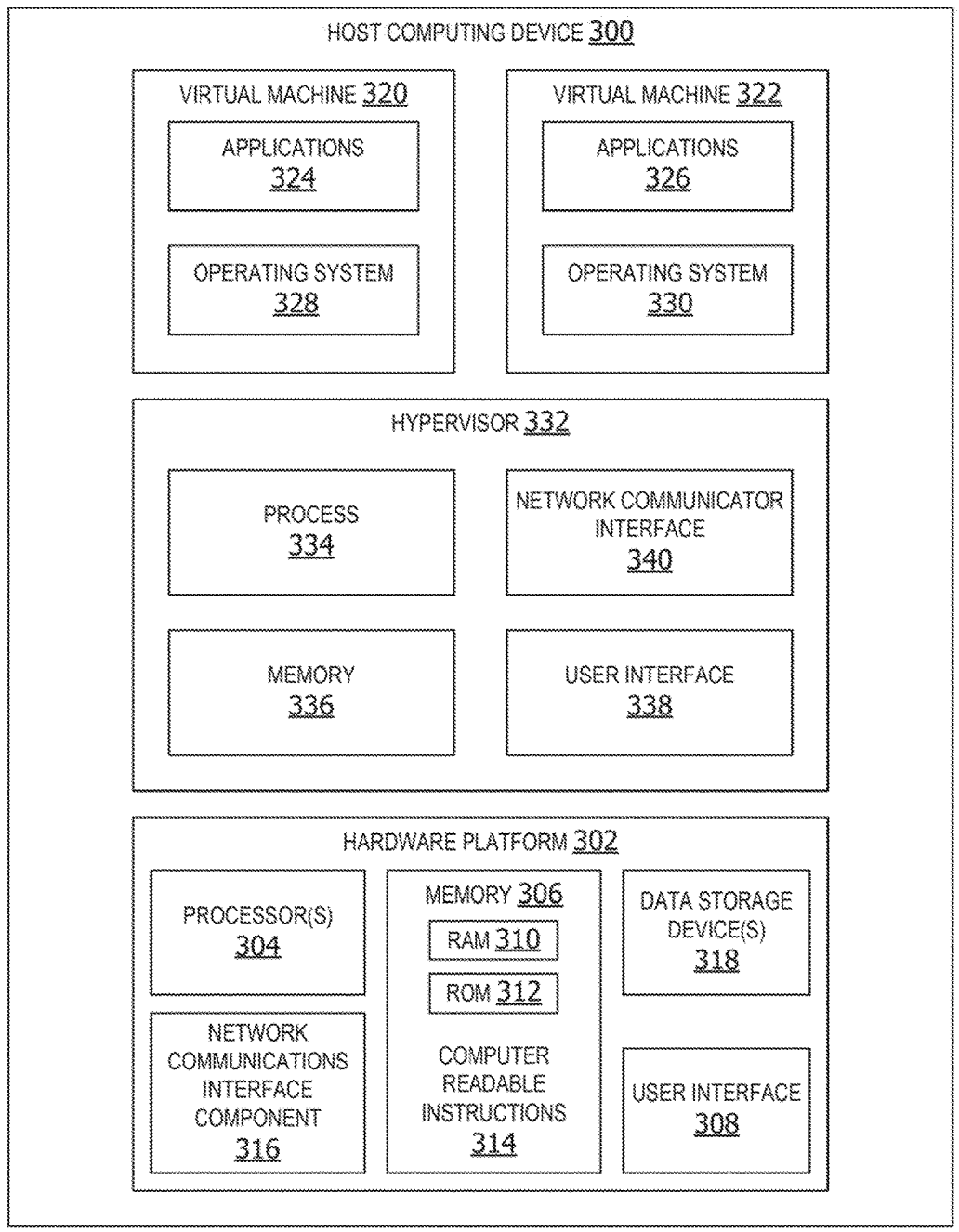
FIG. 3 is a block diagram of a host computing device for serving one or more virtual machines.

FIG. 3 is a block diagram of a host computing device for serving one or more virtual machines. The illustrated host computing device 300 may be implemented as any type of host computing device, such as a server. In some non-limiting examples, the host computing device 300 is implemented as a host or ESXi host from VMware, Inc.

The host computing device 300 represents any device executing instructions (e.g., as application(s), operating system, operating system functionality, or both) to implement the operations and functionality associated with the host computing device 100. The computing device 100 may include desktop personal computers, kiosks, tabletop devices, industrial control devices, wireless charging stations, or server. In some examples, the host computing device 300 is implemented as a blade server within a RSA. Additionally, the host computing device 300 may represent a group of processing units or other computing devices.

The host computing device 300 includes a hardware platform 302. The hardware platform 302, in some examples, includes one or more processor(s) 304, a memory 306, and at least one user interface, such as user interface component 308.

The processor(s) 304 includes any quantity of processing units, and is programmed to execute computer-executable instructions for implementing the examples. The instructions may be performed by the processor or by multiple processors within the host computing device 300, or performed by a processor external to the host computing device 300. In some examples, the one or more processors are programmed to execute instructions such as those illustrated in the figures (e.g., FIG. 9, FIG. 10, FIG. 11, and FIG. 12).

The host computing device 300 further has one or more computer readable media such as the memory 306. The memory 306 includes any quantity of media associated with or accessible by the host computing device 300. The memory 306 may be internal to the host computing device 300 (as shown in FIG. 3), external to the host computing device (not shown), or both (not shown). In some examples, the memory 306 includes read-only memory (ROM) 310.

The memory 306 further stores a random access memory (RAM) 312. The RAM 312 may be any type of random access memory. In this example, the RAM 312 is part of a shared memory architecture. In some examples, the RAM 312 may optionally include one or more cache(s). The memory 306 further stores one or more computer-executable instructions 314.

The host computing device 300 may optionally include a user interface 308 component. In some examples, the user interface 308 includes a graphics card for displaying data to the user and receiving data from the user. The user interface 308 may also include computer-executable instructions (e.g., a driver) for operating the graphics card. Further, the user interface 308 may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor.

In some examples, the hardware platform 302 optionally includes a network communications interface component 316. The network communications interface component 316 includes a network interface card and/or computer-executable instructions (e.g., a driver) for operating the network interface card. Communication between the host computing device 300 and other devices may occur using any protocol or mechanism over any wired or wireless connection. In some examples, the communications interface is operable with short range communication technologies such as by using near-field communication (NFC) tags.

The data storage device(s) 318 may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 318 may include rotational storage, such as a disk. The data storage device(s) 318 may also include non-rotational storage media, such as SSD or flash memory. In some non-limiting examples, the data storage device(s) 218 provide a shared data store, such as shared data store 242 in FIG. 2.

The host computing device 300 hosts one or more virtual machines, such as virtual machines 320 and 322. The virtual machine 320 in some examples, includes data such as, but not limited to, one or more application(s) 324. The virtual machine 322 in this example includes applications(s) 326. The application(s), when executed by the processor(s) 304, operate to perform functionality on the host computing device 300. Exemplary application(s) include, without limitation, mail application programs, web browsers, calendar application programs, address book application programs, messaging programs, media applications, location-based services, search programs, and the like. The application(s) may communicate with counterpart applications or services such as web services accessible via a network. For example, the applications may represent downloaded client-side applications that correspond to server-side services executing in a cloud.

In this example, each virtual machine includes a guest operating system (OS), such as operating system. In this example, virtual machine 320 includes guest operating system (OS) 328 and virtual machine 322 includes guest OS 330.

The host computing device 300 further includes one or more computer executable components. Exemplary components include a hypervisor 332. The hypervisor 332 is a virtual machine monitor that creates and runs one or more virtual machines, such as, but without limitation, virtual machine 320 or virtual machine 322. In one example, the hypervisor 332 is implemented as a vSphere Hypervisor from VMware, Inc.

The host computing device 300 running the hypervisor 332 is a host machine. Virtual machine 320 is a guest machine. The hypervisor 332 presents the OS 328 of the virtual machine 320 with a virtual hardware platform. The virtual hardware platform may include, without limitation, virtualized processor 334, memory 336, user interface device 338, and network communication interface 340. The virtual hardware platform, virtual machine(s) and the hypervisor are illustrated and described in more detail in FIG. 16 below.

Figure 4:
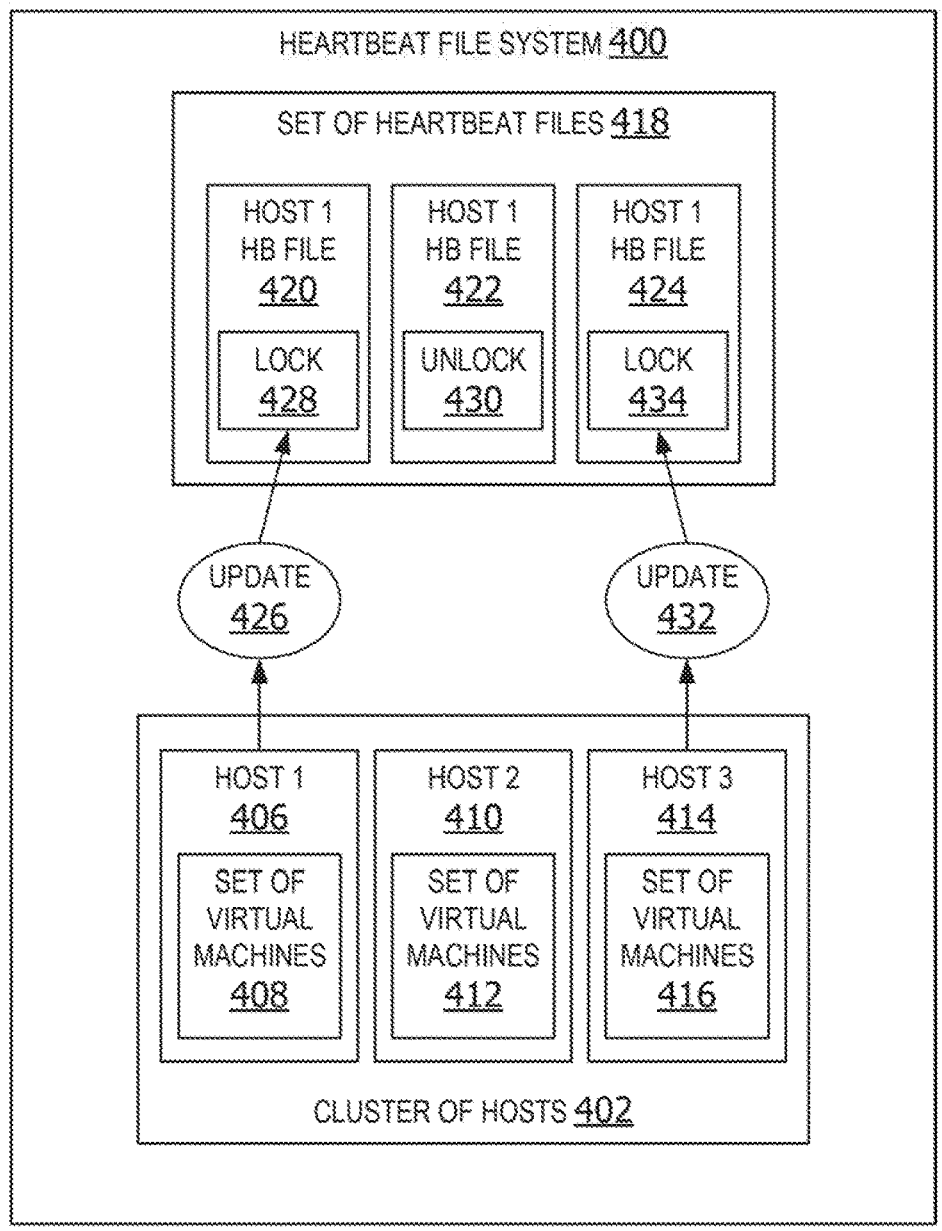
FIG. 4 is a block diagram illustrating a host heartbeat file system in pooled memory.

FIG. 4 is a block diagram illustrating a host heartbeat file system in pooled memory. The heartbeat file system 400 is a filesystem storing heartbeat files for one or more hosts in the plurality of hosts in the cluster of hosts 402 running one or more virtual machines. For example, host 406 serves a set of virtual machines 408, host 410 hosts set of virtual machines 412, and host 414 serves set of virtual machines 416.

Each host in the cluster of hosts 402 creates a host heartbeat file in a set of heartbeat files 418 on the heartbeat file system 400. For example, host 406 is associated with host heartbeat file 420, host 412 is associated with host heartbeat file 422, and host 414 is associated with host heartbeat file 424. In some examples, an agent on the host generates the heartbeat file associated with that host.

Each host sends an update to the heartbeat file associated with that host at an occurrence of an update time interval. In this example, host 406 sends update 426 to host heartbeat file 420 to lock 428 the file. The lock 428 indicates that the host 406 has an active pooled memory heartbeat and/or the host has pooled memory connectivity.

In this example, host 410 fails to send an update at the update time interval. In this example, the heartbeat file 422 for host 410 is unlocked 430. The unlocked pooled memory heartbeat file indicates that the host 410 has lost pooled memory connectivity.

In this example, the host 414 sends an update 432 to the heartbeat file 424 at the update time interval, which maintains the lock 434 on the file. The lock 434 indicates the host 414 has an active pooled memory heartbeat status.

Figure 5:
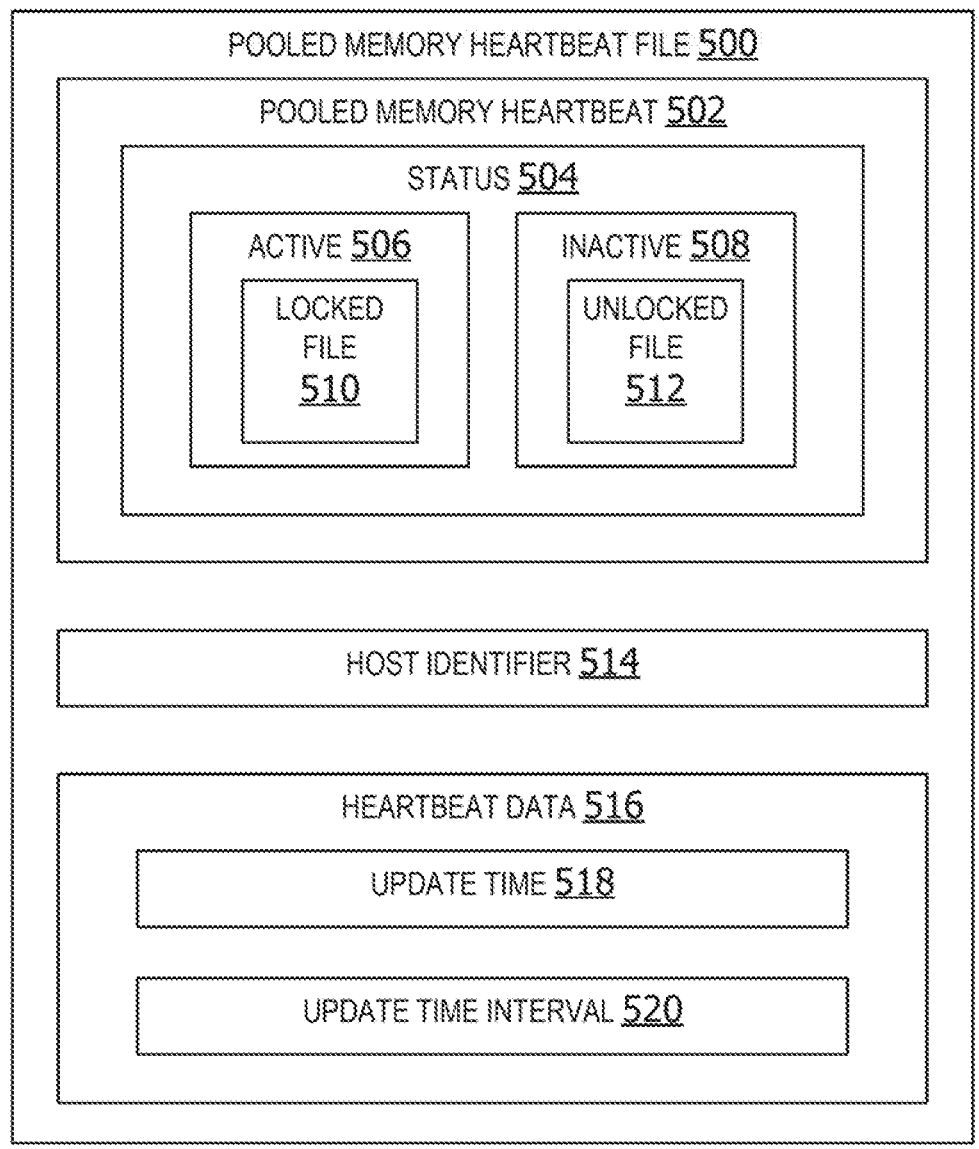
FIG. 5 is a block diagram illustrating a pooled memory heartbeat file in a shared partition on pooled memory.

FIG. 5 is a block diagram illustrating a pooled memory heartbeat file in a shared partition on pooled memory. The pooled memory heartbeat file 500 is a heartbeat file associated with a virtual machine host. The pooled memory heartbeat file 500 is created in a shared partition on the pooled memory. The pooled memory heartbeat 502 indicates whether a pooled memory heartbeat status 504 of the host is active 506 or inactive 508. In this non-limiting example, the active status is indicated by a locked file 510. The inactive status is indicated by an unlocked file 512.

The pooled memory heartbeat file 500 in some examples includes a host identifier 514. The host identifier identifies the host associated with the heartbeat file. If the heartbeat file is unlocked, the master agent checks the host identifier 514 to determine which host has lost pooled memory connectivity.

In other examples, the pooled memory heartbeat file optionally includes other heartbeat data 516, such as, but not limited to, an update time 518 of the last update to the file and/or an update time interval 520 indicating a frequency with which the file is updated to prevent the file from unlocking. If the file is updated at the update time interval, the file remains locked and the pooled memory heartbeat status for the host is active.

Figure 6:
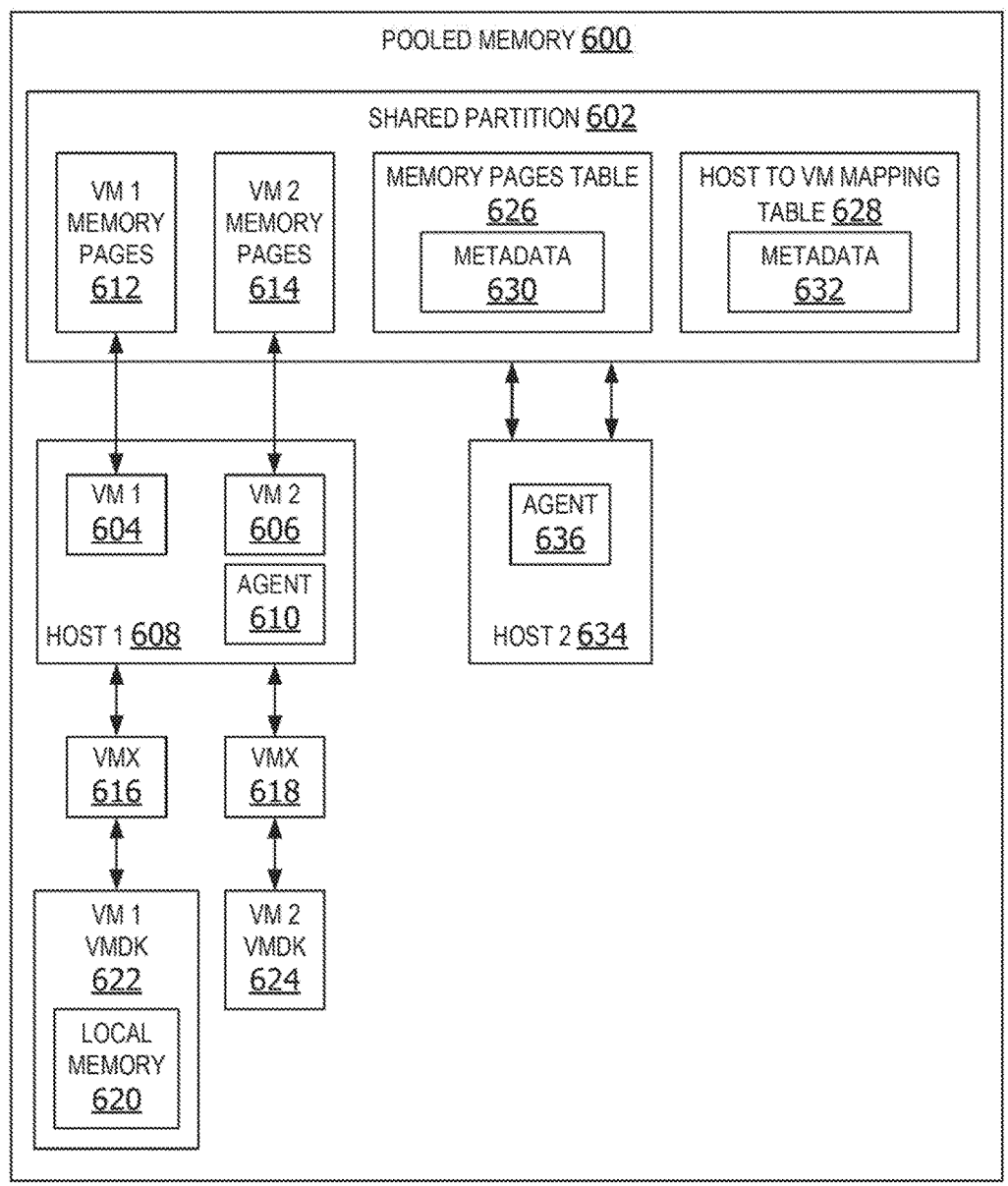
FIG. 6 is a block diagram illustrating a pooled memory for respawning virtual machines.

FIG. 6 is a block diagram illustrating a pooled memory for spawning virtual machines. In this example, the pooled memory 600 includes one or more partitions, such as shared partition 602. The shared partition 602 in this example is accessible by two or more virtual machine hosts. The shared partition 602 stores virtual machine memory pages for virtual machines enabled for spawn from pooled memory, such as virtual machines 604 and 606 running on host 608. An agent 610 on the host 608 maintains the virtual machine memory pages for each virtual machine running on the host. In this example, memory pages 612 includes memory for the virtual machine 604 and memory pages 614 include memory for virtual machine 606. The memory pages 612 in the pooled memory are locked. Even though all hosts have access to the pooled memory, only the virtual machine 604 associated with the memory pages 612 can access, update, modify, or otherwise change the data in memory pages 612. The memory pages 614 are locked such that only virtual machine 606 associated with the memory pages 614 can access, modify, or otherwise change the data in the memory for that particular virtual machine.

Each virtual machine includes configuration data for the virtual machine, such as virtual machine X (VMX) 616 configuration file for virtual machine 604 and VMX 618 configuration file storing configuration data for virtual machine 506. These configuration files are associated with local memory for each virtual machine. For example, local memory 620 for virtual machine 604 is associated with virtual machine disk 622 and local memory for virtual machine 606 is associated with virtual machine disk 624. The local memory 620 for virtual machine 604 is inaccessible to virtual machine 606. Likewise, the local memory for virtual machine 606 is inaccessible to virtual machine 604. In this manner, the configuration data and memory for one virtual machine stored in local memory is unavailable to the new host if the virtual machine is spawned on the new host.

To enable the new host to access the virtual machine memory, configuration data, and other data for maintaining virtual machine state on resuming the virtual machine on a new host, the pooled memory is used to store the virtual machine memory pages, configuration data, memory page table 626, host-to-VM mapping table 628, and any other virtual machine data on shared partitions accessible by the new host.

In this non-limiting example, the memory page table 626 includes metadata 630 identifying virtual machine memory locations on the pooled memory for utilization by a new host during a VM resume. In this example, the metadata 630 identifies memory pages 612 belonging to virtual machine 604. The memory page table also includes entries identifying the memory pages 614 created by virtual machine 606 as belonging to virtual machine 606 running on host 608.

The host-to-VM mapping table 628 includes metadata 632 mapping each virtual machine to the host that is currently serving the virtual machine. In this example, the host-to-VM mapping table 628 includes entries mapping virtual machine 604 and 606 to host 608.

In one example, if host 608 becomes isolated or fails, the virtual machines 604 and 606 are respawned on host 636 using the virtual machine memory pages, and memory page table, host-to-VM mapping. This pooled memory virtual machine memory enables the virtual machines to be respawned on the new host without losing the memory state of the virtual machines.

In some examples, each host has its own host-to-VM mapping table. In other examples, a single host-to-VM mapping table contains entries mapping all hosts to the virtual machines running on each host.

In some examples, while the virtual machines 604 and 606 are running on the host 608, the agent 610 on the host maintains a lock on the memory page table 626. In this non-limiting example, a memory page table is associated with each host. If the host becomes isolated or fails, the lock on the memory page table is released to enable the new host 634 to access the metadata 630 on the memory page table 626 identifying the appropriate VM memory on the pooled memory for the virtual machines respawning on the new host. Once the respawn is completed successfully, the agent 636 on the new host 634 maintains the locks on the memory page table 626. If the new host 634 should subsequently fail or become isolated, the locks on the memory page table would again be released to permit the another host to access the memory page table and respawn the virtual machines 604 and 606 on that host.

In another example, each virtual machine maintains its own memory page table. In this example, the virtual machine maintains the lock on the memory page table. If the host running the virtual machine becomes isolated or fails, the lock is released to permit the new host to access the memory page table for the virtual machine being respawned on the new host.

In this example, the virtual machine memory pages are placed into shared pooled memory from the very beginning when the virtual machine is configured or powered on. This example has potential issues related to running a virtual machine off of another virtual machine host's memory.

In another example, the virtual machine memory pages are placed into the pooled memory only when a network partition is detected. A network partition includes an isolation event or host failure event. This would require the source and target hosts to negotiate over the shared partition in the pooled memory. Waiting to move the virtual machine memory pages into the pooled memory when the network partition is detected may require more time to move the virtual machine to another host. However, moving the virtual machine memory upon occurrence of a network partition potentially allows the virtual machine to run faster using only the local memory.

Figure 7:
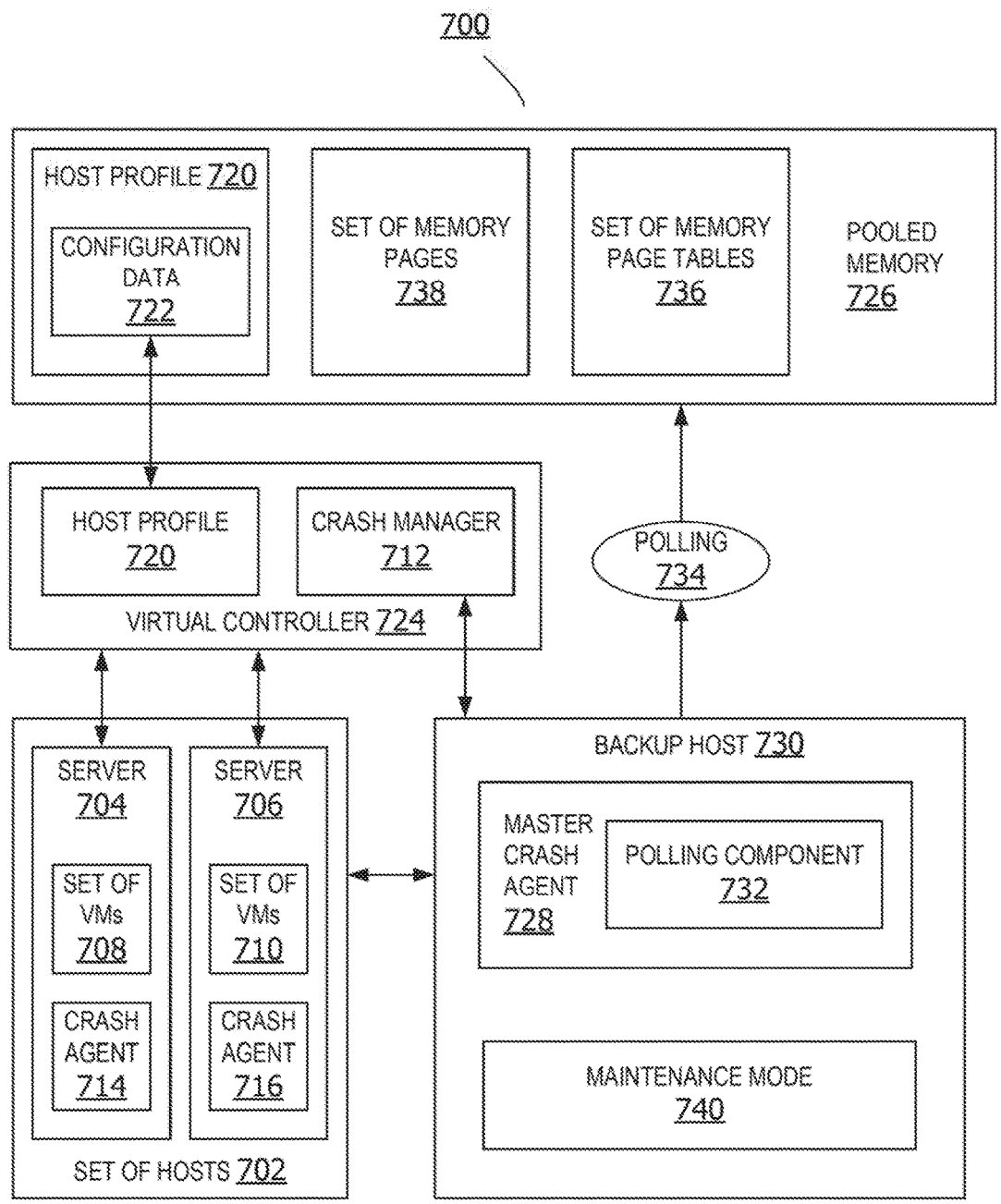
FIG. 7 is a block diagram illustrating a crash agent polling memory page tables on a shared partition in pooled memory.

FIG. 7 is a block diagram illustrating a crash agent polling memory page tables on a shared partition in pooled memory. The pooled memory architecture 700 in this example includes a set of hosts 702, such as, but not limited to, server 704 and server 706. Each server serves a set of virtual machines, such as set of VMs 708 on server 704 and set of VMs 710 on server 706.

A crash manager 712 associated with a virtual controller 724 pushes a crash agent onto each host in the set of hosts 702. In this example, crash agent 714 is associated with server 704 and crash agent 716 is associated with server 706. Each crash agent maintains a memory page table for the host. When the crash agent updates the memory page table, the memory page table is locked for write access.

Each host in the set of hosts also includes a host profile 720. The host profile 720 includes configuration data 722 for the host. A copy of the host profile 720 is stored on the pooled memory 726.

A master crash agent 728 on a backup host 730 includes a polling component 732 for polling 734 set of memory page tables 736 for write access. If any host fails to update the memory table for that host, the memory page table will be unlocked for write access.

In some examples, a host is assigned an update threshold time. If the host fails to update the memory page table associated with that host within the update threshold time, the memory page table is unlocked.

In some examples, if the backup host obtains write access to a memory page table for a host, such as server 704, the master crash agent identifies that host as a failed or isolated host. The master crash agent utilizes the metadata in the memory page table to access the set of memory pages for server 704. The master crash agent quiesces the set of virtual machines 708 on the server 704 to stop or freeze the virtual machine processes running on the virtual machines. The term "quiesce" refers to freezing, stopping, or otherwise halting one or more processes or operations.

The set of virtual machines 708 are killed on that host. The master crash agent releases the locks on the set of memory pages 738.

In some examples, the host profile 720 associated with the failed or isolated host is applied to the backup host 730 during the virtual machine respawn process. The maintenance mode 740 is changes to an active mode and the set of virtual machines 708 are respawned on backup host 730. The backup host is the new host for the set of virtual machines 708.

Figure 8:
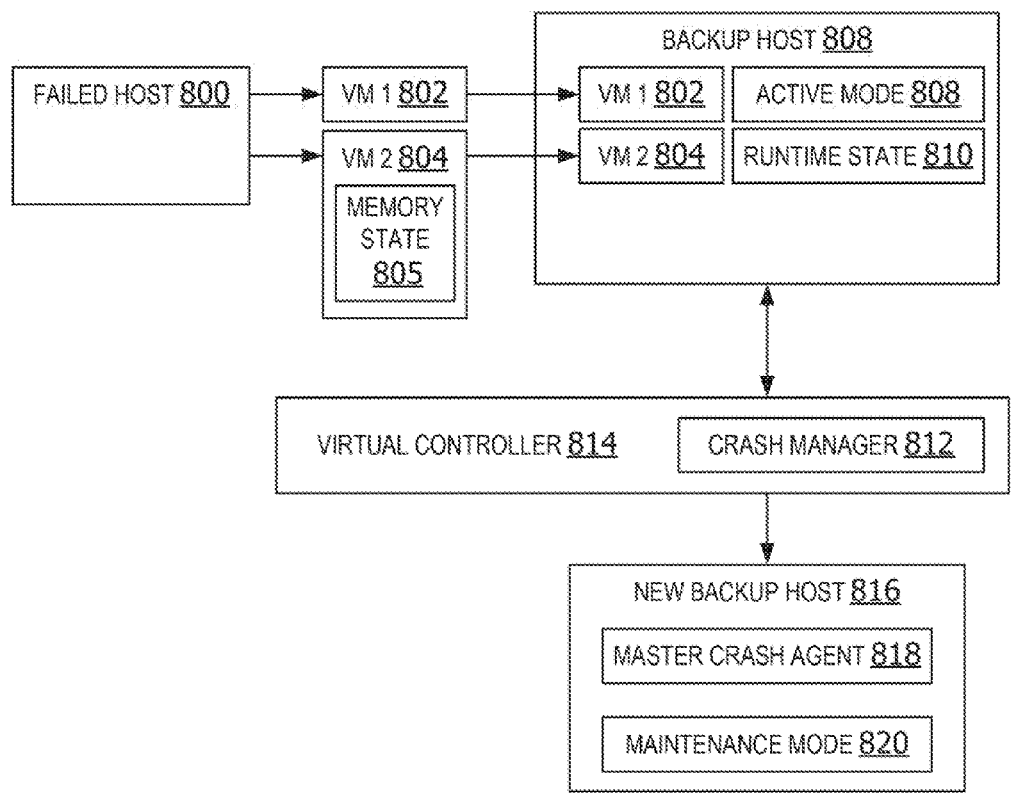
FIG. 8 is a block diagram illustrating respawning virtual machines on a backup host.

FIG. 8 is a block diagram illustrating respawning virtual machines on a backup host. The failed host in this example is a host that is isolated or crashed. An isolated host is a host that is network isolated, lost shared data store connectivity, or lost pooled memory connectivity. In some examples, a crashed host is a host that has lost network connectivity and pooled memory connectivity. In other examples, the crashed host is a host that has lost network connectivity, shared data store connectivity, and pooled memory connectivity.

The virtual machines running on the failed host 800, such as virtual machine 802 and virtual machine 804 are respawned on the backup host 806. In some examples, the backup host may be a backup appliance or a backup host appliance.

The backup host is changed from a maintenance mode to an active mode 808. The virtual machine memory in pooled memory is accessed by the backup host to maintain memory state 805 and runtime state 810 of the virtual machines.

When the virtual machines are successfully respawned on the backup host, the crash manager 812 running on the virtual controller 814 in this non-limiting example creates a new backup host 816. The new backup host 816 is placed in a maintenance mode. A master crash agent 818 on the new backup host 816 polls the memory page tables on the pooled memory for write access. If the new backup host 816 obtains the write access to a memory page table for any host, the virtual machines running on that host are respawned on the new backup host 816.

Figure 9:
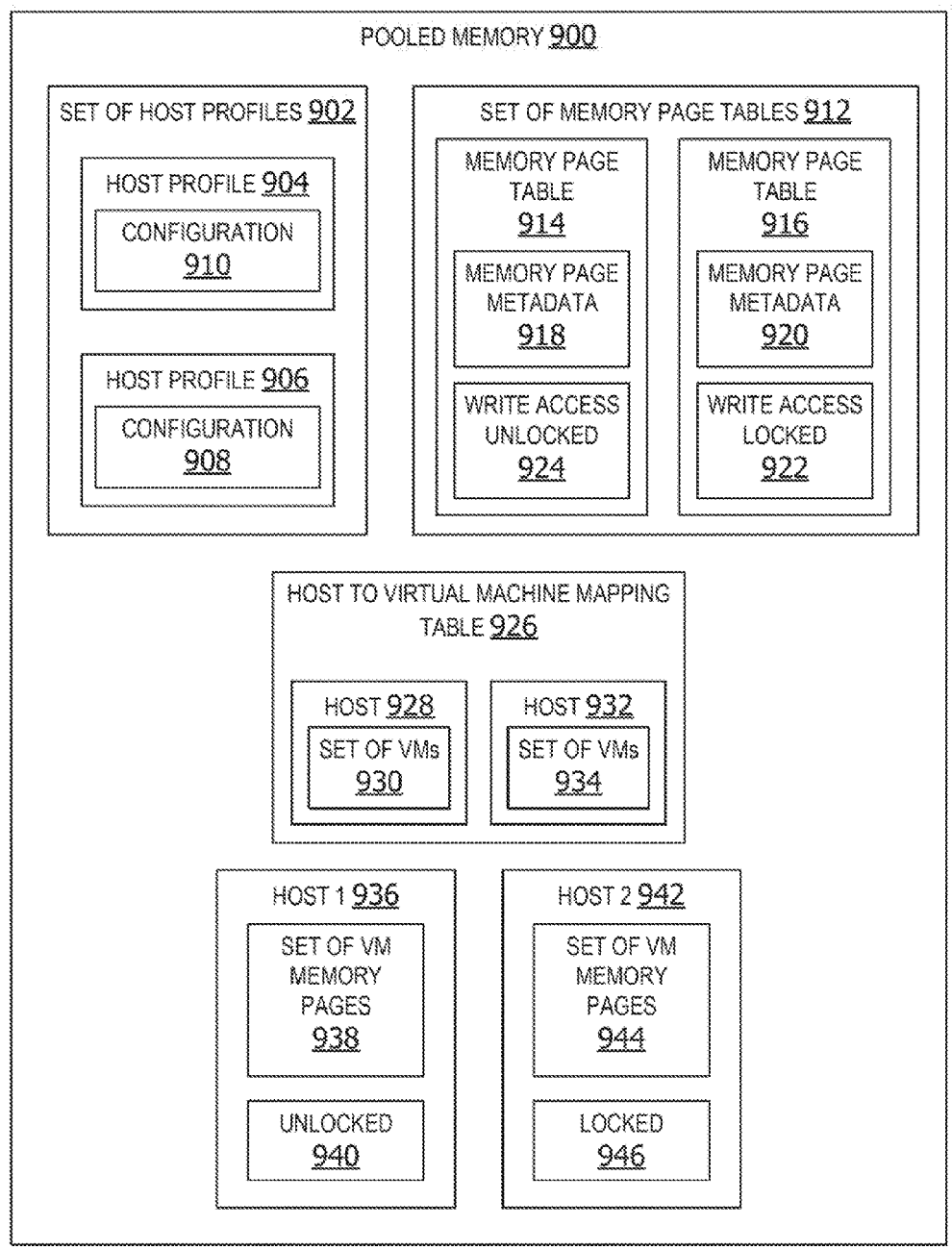
FIG. 9 is a block diagram illustrating a pooled memory including host data and virtual machine data.

FIG. 9 is a block diagram illustrating a pooled memory including host data and virtual machine data. The pooled memory 900 in some non-limiting examples includes a set of host profiles. The set of host profiles 902 in this example includes a host profile for one or more hosts, such as host profile 904 and host profile 906. In some examples, each host profile may be stored in a separated shared partition on pooled memory. In other examples, two or more host profiles are stored in the same shared partition. The host profile includes configuration data for a host, such as configuration 908 in host profile 906 and configuration 910 in host profile 904.

In other examples, the pooled memory 900 includes a set of memory page tables 912. The set of memory page tables 912 includes one or more memory page tables, such as memory page table 914 and memory page table 916. Memory page table 914 in this example is associated with at least one virtual machine. The memory page table 914 includes memory page metadata. The memory page metadata identifies one or more memory pages for the virtual machine. The memory page table may be locked or unlocked. In this example, the memory page table 914 is write access unlocked 924. If a master crash agent polls the memory page table 914 for write access, the master crash agent will obtain write access to the memory page table. In this example, the one or more virtual machines associated with the memory page table 914 are respawned on a new host using the memory page metadata 918.

The memory page table 916 includes memory page metadata 920. The memory page metadata identifies one or more virtual memory pages in pooled memory associated with one or more virtual machines. In this examples, the memory page table 916 is write access locked 922. If a master crash agent polls the memory page table 916 for write access, the master crash agent will be unable to obtain write access. In this examples, the virtual machines associated with memory page table are not respawned on a new host.

In other examples, the pooled memory 900 includes at least one host to virtual machine mapping table 926. The host-to-VM mapping table 926 maps hosts to virtual machines. For example, host 928 is mapped to a set of virtual machines 930 running on the host 928. The host 932 to mapped to a different set of virtual machines 934 running on host 932.

In still other examples, the pooled memory 900 includes one or more shared partitions for virtual machine memory pages. For example, shared partition 936 includes a set of virtual machine memory pages 938 associated with a first virtual machine and set of virtual machine memory pages 944 associated with a second virtual machine on shared partition 942.

In some examples, the set of virtual machine memory pages includes a lock. The lock prevents one host from accessing or modifying the set of memory pages for a virtual machine running on a different host. In this non-limiting example, set of virtual machine memory pages 938 is unlocked 940 and the set of virtual machine memory pages 944 is locked 946.

Figure 10:
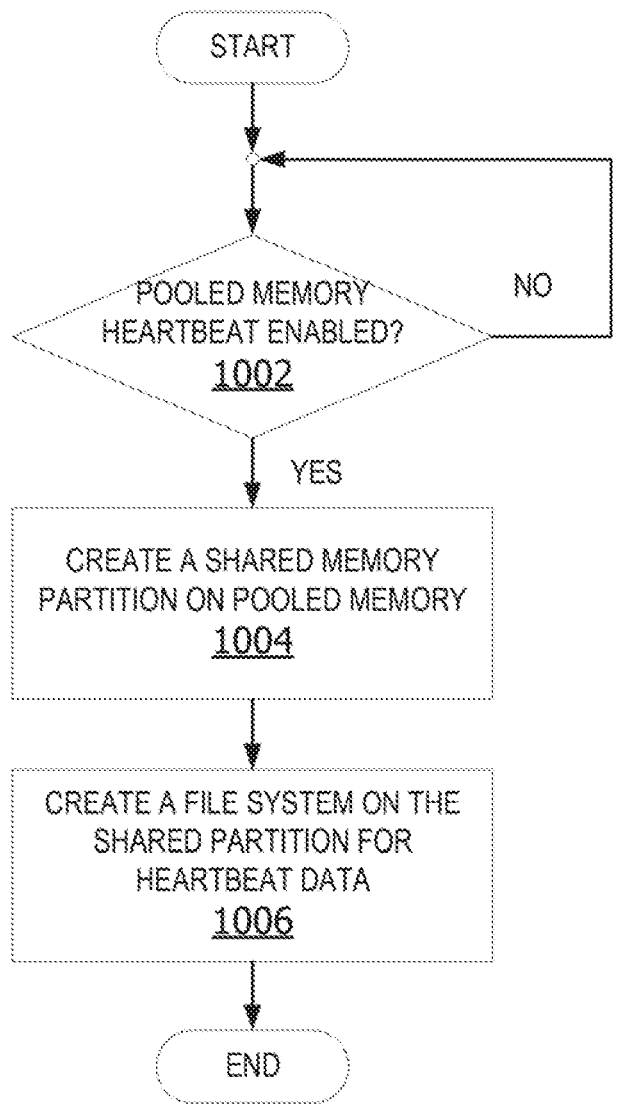
FIG. 10 is a flowchart of a process for configuration of a pooled memory for heartbeat monitoring.

FIG. 10 is a flowchart of a process for configuration of a pooled memory for heartbeat monitoring. The process shown in FIG. 10 may be performed by a server or virtual controller, such as, but not limited to, virtual controller 244 in FIG. 2, virtual controller 724 in FIG. 7, or virtual controller 814 in FIG. 8. Further, execution of the operations illustrated in FIG. 10 is not limited to a virtual controller. One or more computer-readable storage media storing computer-readable instructions may execute to cause at least one processor to implement the operations illustrated in FIG. 10.

A determination is made as to whether a pooled memory heartbeat monitoring is enabled for a given virtual machine at 1002. If no, the process returns to 1002 until pooled memory heartbeat monitoring is enabled. A shared memory partition is created on the pooled memory at 1004. A pooled memory heartbeat file system is created on the shared partition for heartbeat data at 1006. The process terminates thereafter.

While the operations illustrated in FIG. 10 are described as being performed by a host computing device or a server, aspects of the disclosure contemplate that performance of the operations by other entities. For example, a cloud service may perform one or more of the operations.

Figure 11:
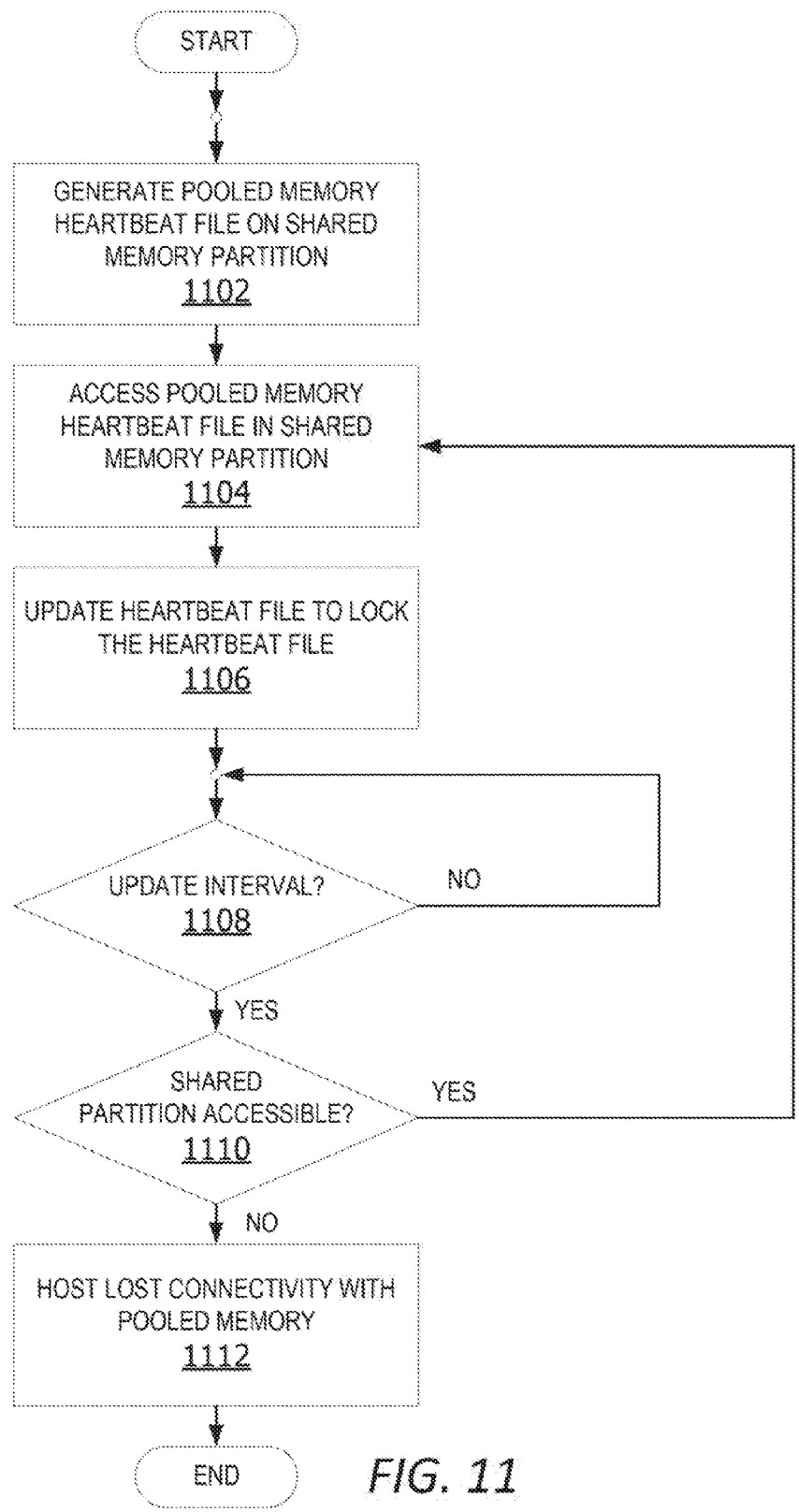
FIG. 11 is a flowchart of a process for pooled memory heartbeat for a host in a cluster.

FIG. 11 is a flowchart of a process for pooled memory heartbeat for a host in a cluster. The process shown in FIG. 11 may be performed by a virtual machine, such as, but not limited to, host 210 in FIG. 2, host computing device 300 in FIG. 3, host 406 in FIG. 4, host 608 in FIG. 6, or server 704 in FIG. 7. Further, execution of the operations illustrated in FIG. 11 is not limited to a virtual controller. One or more computer-readable storage media storing computer-readable instructions may execute to cause at least one processor to implement the operations illustrated in FIG. 11.

A pooled memory heartbeat file is generated on a shared memory partition at 1102. The pooled memory heartbeat file in the shared memory partition is accessed at 1104. The heartbeat file is updated to lock the heartbeat file at 1106. A determination is made as to whether an update interval has occurred at 1108. If yes, a determination is made as to whether the shared partition is accessible at 1110. If yes, the process returns to 1104 to access the pooled memory heartbeat file and update the heartbeat file iteratively at each update interval until the shared partition is inaccessible at 1110. When the shared partition is no longer accessible, the host has lost connectivity with the pooled memory at 1112. The process terminates thereafter.

While the operations illustrated in FIG. 11 are described as being performed by a host computing device or a server, aspects of the disclosure contemplate that performance of the operations by other entities. For example, a cloud service may perform one or more of the operations.

Figure 12:
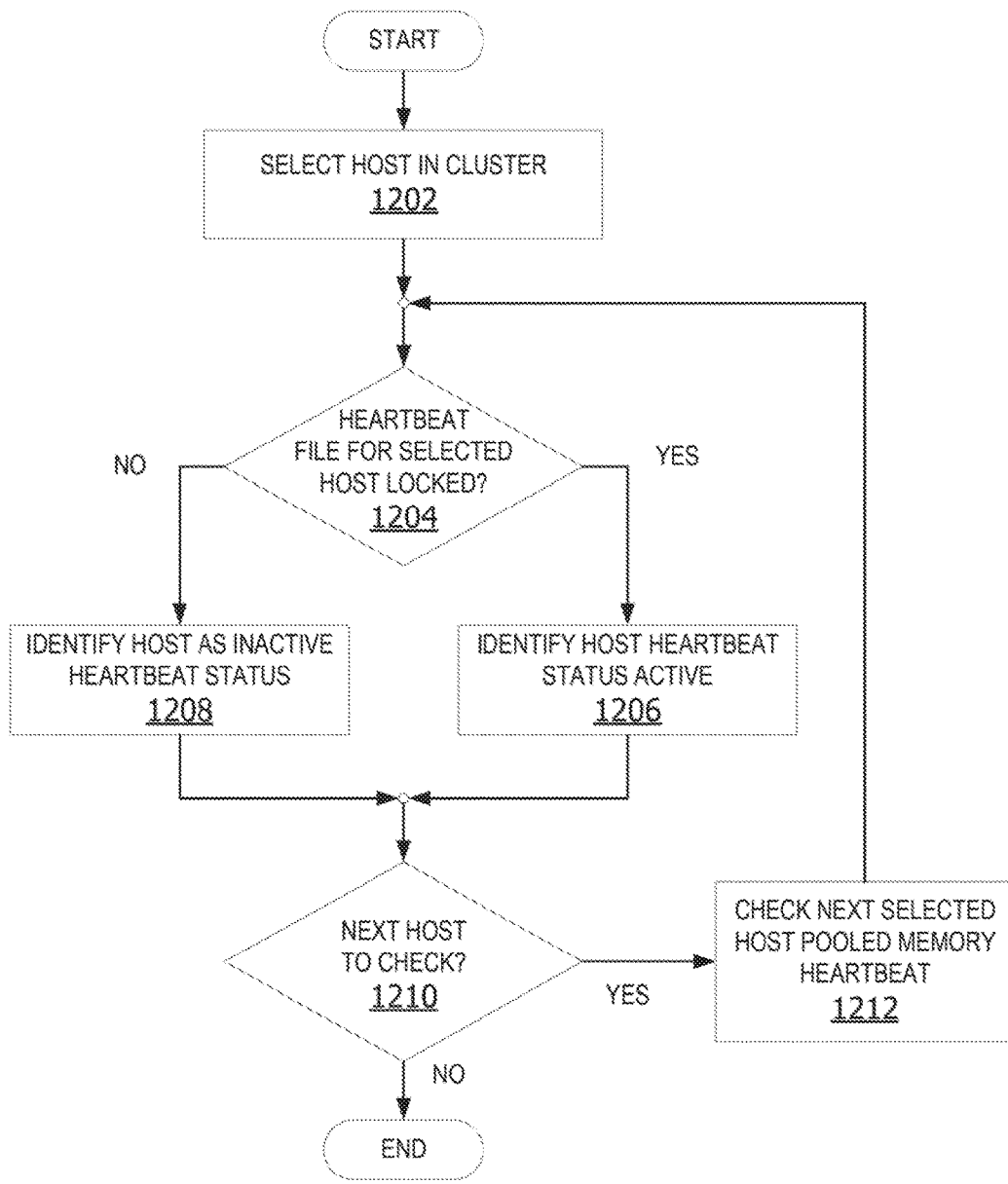
FIG. 12 is a flowchart of a process for pooled memory heartbeat monitoring.

FIG. 12 is a flowchart of a process for pooled memory heartbeat monitoring. The process shown in FIG. 12 may be performed by an agent on a virtual machine host, such as, but not limited to, host 210 in FIG. 2, host computing device 300 in FIG. 3, host 406 in FIG. 4, host 608 in FIG. 6, or server 704 in FIG. 7. Further, execution of the operations illustrated in FIG. 11 is not limited to a virtual controller. One or more computer-readable storage media storing computer-readable instructions may execute to cause at least one processor to implement the operations illustrated in FIG. 12.

A host in a cluster of virtual machine hosts is selected at 1202. A determination is made as to whether a heartbeat file for the selected host is locked at 1204. If yes, the host heartbeat status is identified as an active status at 1206. If the heartbeat file is not locked at 1204, the host is identified as an inactive heartbeat status at 1208. A determination is made as to whether a next host to be checked. If yes, a next host is selected at 1212. The process iteratively checks a heartbeat file for heartbeat status until all host heartbeat files are checked and there is not a next host to check at 1210. The process terminates thereafter.

While the operations illustrated in FIG. 12 are described as being performed by a host computing device or a server, aspects of the disclosure contemplate that performance of the operations by other entities. For example, a cloud service may perform one or more of the operations.

Figure 13:
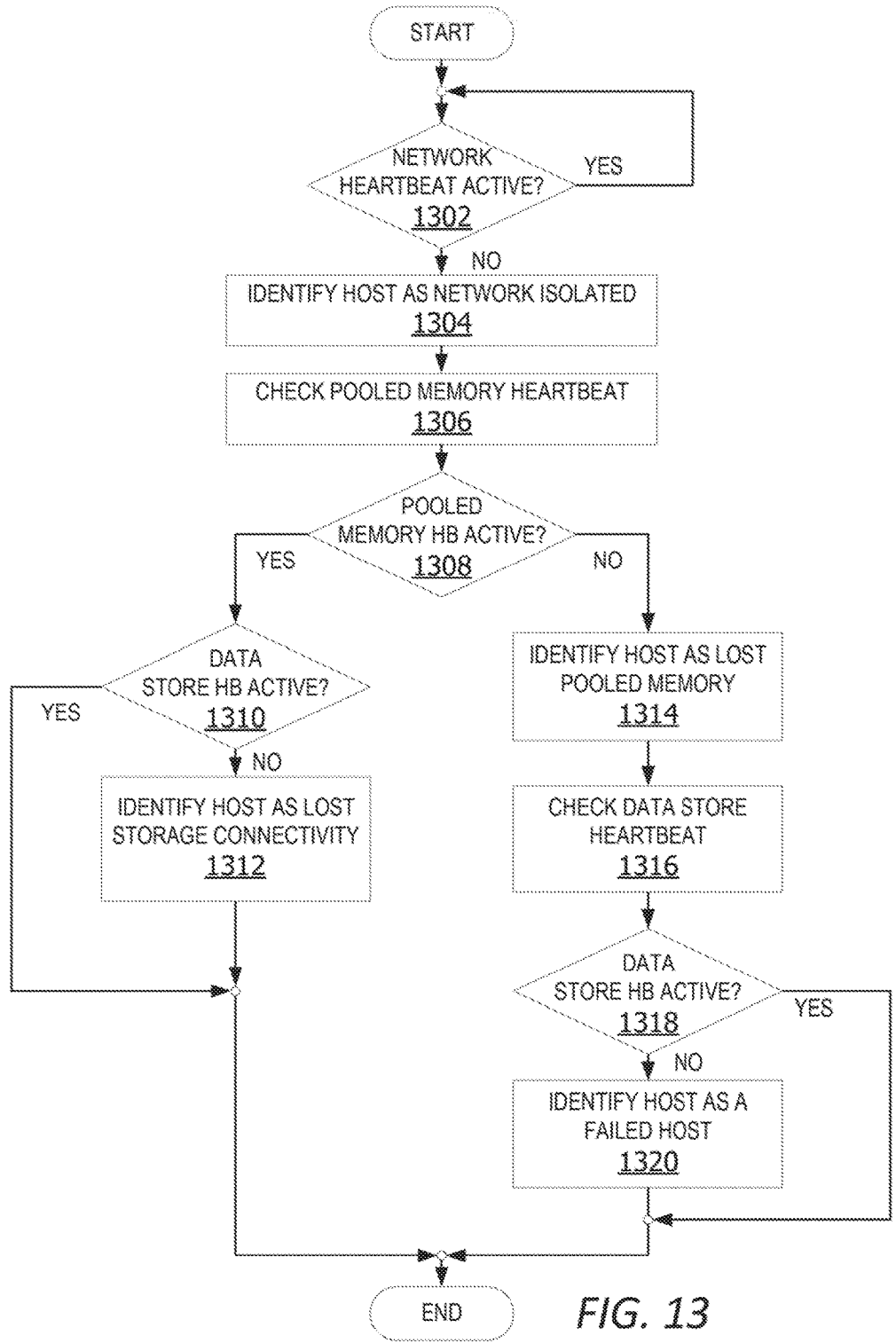
FIG. 13 is a flowchart of a process for determining if a network isolated host is a failed host.

FIG. 13 is a flowchart of a process for determining if a network isolated host is a failed host. The process shown in FIG. 13 may be performed by an agent on a virtual machine host, such as, but not limited to, host 210 in FIG. 2, host computing device 300 in FIG. 3, host 406 in FIG. 4, host 608 in FIG. 6, or server 704 in FIG. 7. Further, execution of the operations illustrated in FIG. 11 is not limited to a virtual controller. One or more computer-readable storage media storing computer-readable instructions may execute to cause at least one processor to implement the operations illustrated in FIG. 13.

A determination is made as to whether a network heartbeat is active at 1302. If yes, the process returns to 1302. If the network heartbeat is inactive at 1302, the host is identified as a network isolated host at 1304. The pooled memory heartbeat is checked at 1306. A determination is made as to whether the pooled memory heartbeat is active at 1308. If yes, a determination is made as to whether a data store heartbeat is active at 1310. If yes, the process terminates thereafter.

Returning to 1310, if the data store heartbeat is not active, the host is identified as having lost storage connectivity at 1312. The process terminates thereafter.

Returning to 1308, if the pooled memory heartbeat is not active, the host is identified as having lost pooled memory at 1314. The process checks a data store heartbeat at 1316. A determination is made as to whether the data store heartbeat is active at 1318. If yes, the process terminates thereafter.

Returning to 1318, if the network heartbeat is inactive, the pooled memory heartbeat is inactive, and the data store heartbeat is inactive, the host is identified as a failed host at 1320. The process terminates thereafter.

While the operations illustrated in FIG. 13 are described as being performed by a host computing device or a server, aspects of the disclosure contemplate that performance of the operations by other entities. For example, a cloud service may perform one or more of the operations.

In some embodiments, whenever there is a host network disconnection, the master agent checks the host heartbeat status in the pooled memory chunk allocated for hosts heartbeat to determine whether there is a heartbeat from that particular host. Based on the host heartbeat data in pooled memory, the master agent determines whether the host is a failed host or only a network isolated host. In still other embodiment, the master agent utilizes the network heartbeat, pooled memory heartbeat, and shared data store heartbeat for a host to make a host status deduction.

FIG. 14 is a heartbeat status deduction table. The table 1400 identifies a network heartbeat 1402, a pooled memory heartbeat 1404, a shared storage heartbeat 1406, a host status deduction 1408, and a reaction by the master agent 1410.

In one example shown at 1412, if the network heartbeat is inactive, the pooled memory is inactive, and the data store heartbeat is inactive, the host status deduction is failed or crashed. The agent resumes the virtual machines on a healthier host.

In another example shown at 1414, if the network heartbeat is inactive, the pooled memory is active, and the data store heartbeat is active, the host status deduction is an operational host that is network isolated or partitioned. The virtual machines may be allowed to continue running on the network isolated host or resume the virtual machines on a healthier host based on a user selection.

In another example shown at 1416, if the network heartbeat status is inactive, the pooled memory is active, and the data store heartbeat is inactive, the host status deduction is network isolated with lost storage connectivity. The virtual machines may be resumed on a healthier host based on a user selection.

In another example shown at 1418, if the network heartbeat is active, the pooled memory is inactive, and the data store heartbeat is inactive, the host status deduction is host lost pooled memory and lost storage connectivity. The virtual machines may be respawned using local memory if it is residing on pooled memory and on the host where storage is accessible.

In still another example shown at 1420, if the network heartbeat is inactive, the pooled memory is inactive, and the data store heartbeat is active, the host status deduction is host lost pooled memory and is isolated. The virtual machines may be allowed to continue running on the network isolated host or resume the virtual machines on a healthier host based on a user selection. The virtual machines may be respawned using local memory if it is residing on pooled memory.

In yet another example shown at 1422, if the network heartbeat is active, the pooled memory is active, and the shared data store heartbeat status is inactive, the host status deduction is an operational host lost storage connectivity. The virtual machines may be respawned on a healthier host where storage is accessible. In other words, the virtual machines are resumed on a host that has connectivity to the shared data store.

In still another example shown at 1424, if the network heartbeat is active, the pooled memory is inactive, and the data store heartbeat is active, the host status deduction is operational host has lost pooled memory. The virtual machines may be respawned on local memory if it is residing on pooled memory.

In still another example shown at 1426, if the network heartbeat is active, the pooled memory is active, and the data store heartbeat is active, the host status deduction is a healthy host associated with a normally operating host status. In this example, no action is required.

Figure 15:
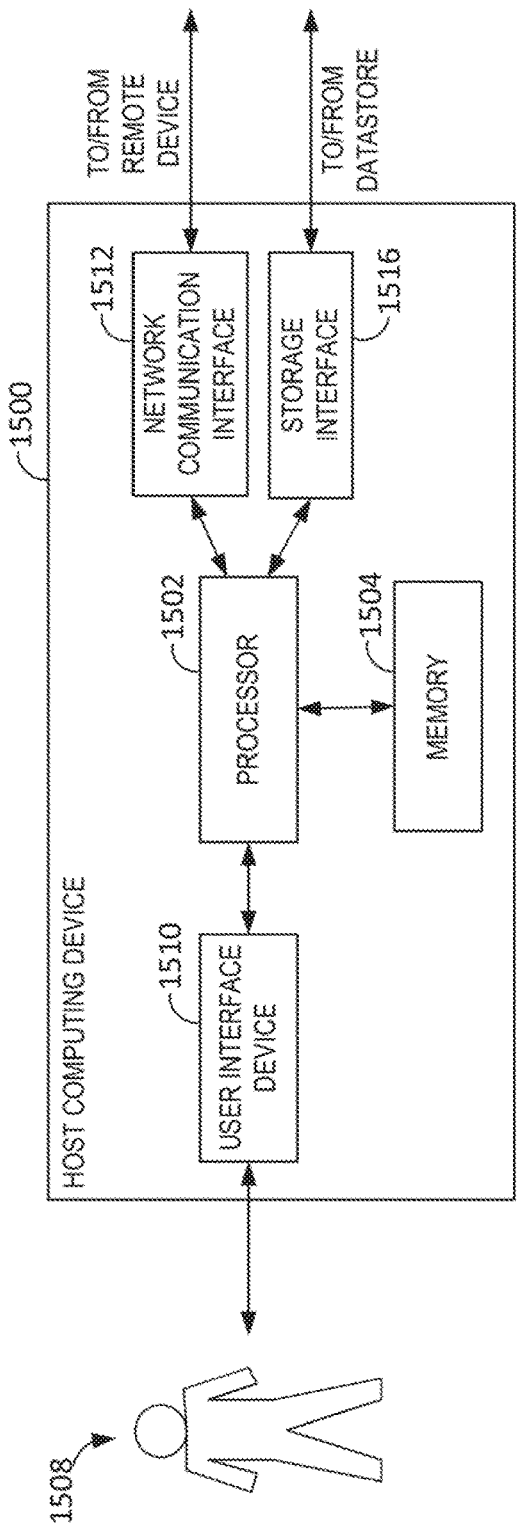
FIG. 15 is a block diagram of an exemplary host computing device.

FIG. 15 is a block diagram of an example host computing device. A host computing device 1500 includes a processor 1502 for executing instructions. In some examples, executable instructions are stored in a memory 1504. Memory 1504 is any device allowing information, such as executable instructions and/or other data, to be stored and retrieved. For example, memory 1504 may include one or more random access memory (RAM) modules, flash memory modules, hard disks, solid state disks, and/or optical disks.

Host computing device 1500 may include a user interface device 1510 for receiving data from a user 1508 and/or for presenting data to user 1508. User 1508 may interact indirectly with host computing device 1500 via another computing device such as VMware's vCenter Server or other management device. User interface device 1510 may include, for example, a keyboard, a pointing device, a mouse, a stylus, a touch sensitive panel (e.g., a touch pad or a touch screen), a gyroscope, an accelerometer, a position detector, and/or an audio input device.

In some examples, user interface device 1510 operates to receive data from user 1508, while another device (e.g., a presentation device) operates to present data to user 1508. In other examples, user interface device 1510 has a single component, such as a touch screen, that functions to both output data to user 1508 and receive data from user 1508. In such examples, user interface device 1510 operates as a presentation device for presenting information to user 1508. In such examples, user interface device 1510 represents any component capable of conveying information to user 1508. For example, user interface device 1510 may include, without limitation, a display device (e.g., a liquid crystal display (LCD), organic light emitting diode (OLED) display, or "electronic ink" display) and/or an audio output device (e.g., a speaker or headphones). In some examples, user interface device 1510 includes an output adapter, such as a video adapter and/or an audio adapter. An output adapter is operatively coupled to processor 1502 and configured to be operatively coupled to an output device, such as a display device or an audio output device.

Host computing device 1500 also includes a network communication interface 1512, which enables host computing device 1500 to communicate with a remote device (e.g., another computing device) via a communication medium, such as a wired or wireless packet network. For example, host computing device 1500 may transmit and/or receive data via network communication interface 1512. User interface device 1510 and/or network communication interface 1512 may be referred to collectively as an input interface and may be configured to receive information from user 1508.

Host computing device 1500 further includes a storage interface 1516 that enables host computing device 1500 to communicate with one or more data stores, which store virtual disk images, software applications, and/or any other data suitable for use with the methods described herein. In example examples, storage interface 1516 couples host computing device 1500 to a storage area network (SAN) (e.g., a Fibre Channel network) and/or to a network-attached storage (NAS) system (e.g., via a packet network). The storage interface 1516 may be integrated with network communication interface 1512.

Figure 16:
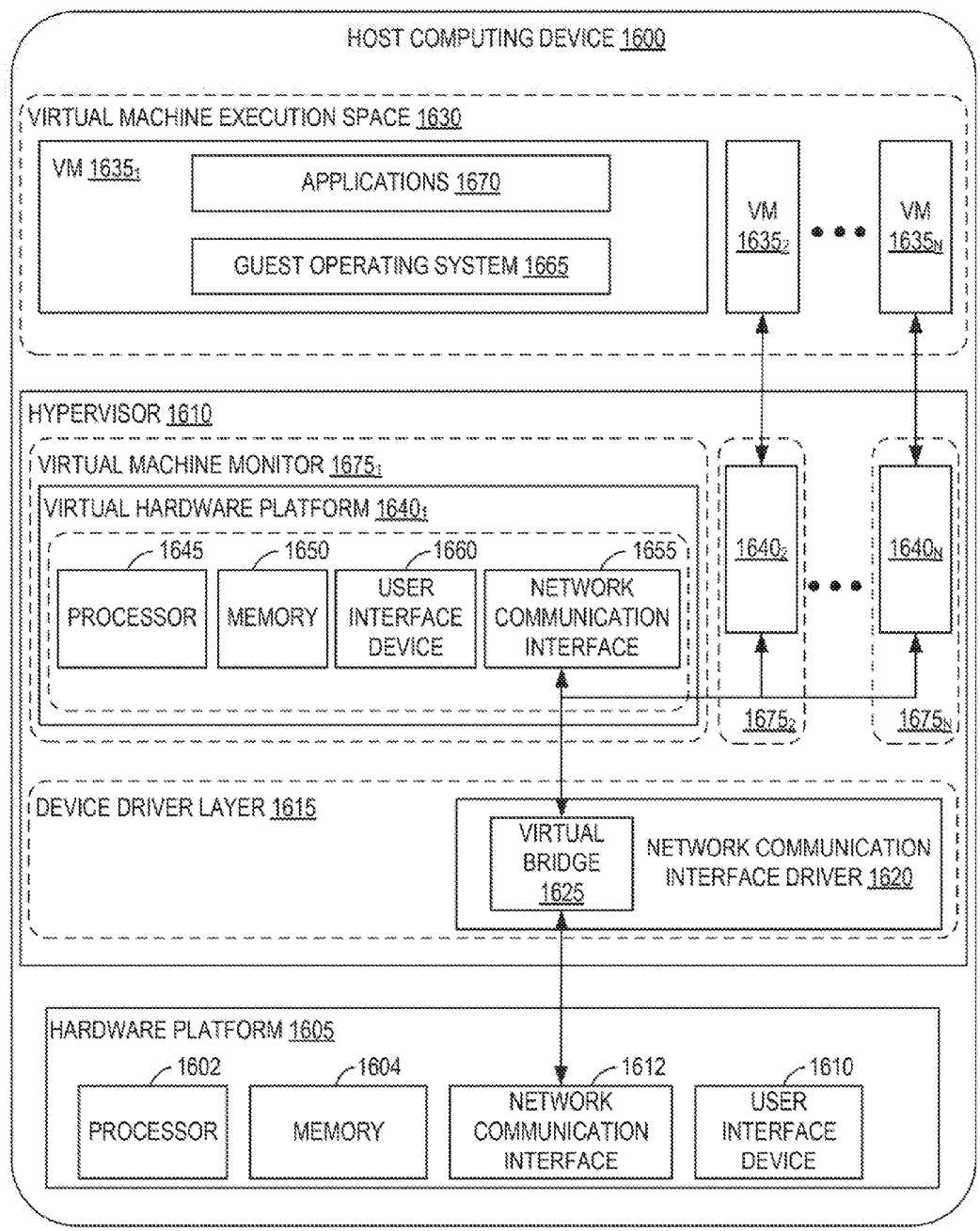
FIG. 16 is a block diagram of virtual machines that are instantiated on host computing device.

FIG. 16 depicts a block diagram of virtual machines $1635_1$, $1635_2$ . . . $1635_N$ that are instantiated on host computing device 1600. Host computing device 1600 includes a hardware platform 1605, such as an x86 architecture platform. Hardware platform 1605 may include processor 1602, memory 1604, network communication interface 1612, user interface device 1610, and other input/output (110) devices, such as a presentation device 1606. A virtualization software layer is installed on top of hardware platform 1605. The virtualization software layer in this example includes a hypervisor 1610.

The virtualizalion software layer supports a virtual machine execution space 1630 within which multiple virtual machines (VMs $1635_1$-$1635_N$) may be concurrently instantiated and executed. Hypervisor 1610 includes a device driver layer 1615, and maps physical resources of hardware platform 1605 (e.g., processor 1602, memory 1604, network communication interface 1612, and/or user interface device 1610) to "virtual" resources of each of VMs $1635_1$-$1635_N$ such that each of VMs $1635_1$-$1635_N$ has its own virtual hardware platform (e.g., a corresponding one of virtual hardware platforms $1640_1$-$1640_N$), each virtual hardware platform having its own emulated hardware (such as a processor 1645, a memory 1650, a network communication interface 1655, a user interface device 1660 and other emulated I/O devices in VM $1635_1$). Hypervisor 1610 may manage (e.g., monitor, initiate, and/or terminate) execution of VMs $1635_1$-$1635_N$ according to policies associated with hypervisor 1610, such as a policy specifying that VMs $1635_1$-$1635_N$ are to be automatically respawned upon unexpected termination and/or upon initialization of hypervisor 1610. In addition, or alternatively, hypervisor 1610 may manage execution VMs $1635_1$-$1635_N$ based on requests received from a device other than host computing device 1601. For example, hypervisor 1610 may receive an execution instruction specifying the initiation of execution of first VM $1635_1$ from a management device via network communication interface 1612 and execute the execution instruction to initiate execution of first VM $1635_1$.

In some examples, memory 1650 in first virtual hardware platform $1640_1$ includes a virtual disk that is associated with or "mapped to" one or more virtual disk images stored on a disk (e.g., a hard disk or solid state disk) of host computing device 1600. The virtual disk image represents a file system (e.g., a hierarchy of directories and files) used by first VM $1635_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 1615 includes, for example, a communication interface driver 1720 that interacts with network communication interface 1612 to receive and transmit data from, for example, a local area network (LAN) connected to host computing device 1600. Communication interface driver 1620 also includes a virtual bridge 1625 that simulates the broadcasting of data packets in a physical network received from one communication interface (e.g., network communication interface 1612) to other communication interfaces (e.g., the virtual communication interfaces of VMs 1635$_1$-1635$_N$). Each virtual communication interface for each VM 1635$_1$-1635$_N$, such as network communication interface 1655 for first VM 1635$_1$, may be assigned a unique virtual Media Access Control (MAC) address that enables virtual bridge 1625 to simulate the forwarding of incoming data packets from network communication interface 1612. In an example, network communication interface 1612 is an Ethernet adapter that is configured in "promiscuous mode" such that all Ethernet packets that it receives (rather than just Ethernet packets addressed to its own physical MAC address) are passed to virtual bridge 1625, which, in turn, is able to further forward the Ethernet packets to VMs 1635$_1$-1635$_N$. This configuration enables an Ethernet packet that has a virtual MAC address as its destination address to properly reach the VM in host computing device 1600 with a virtual communication interface that corresponds to such virtual MAC address.

Virtual hardware platform 1640$_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1665 in order to execute applications 1670 for an instantiated VM, such as first VM 1635$_1$. Virtual hardware platforms 1640$_1$-1640$_N$ may be considered to be part of virtual machine monitors (VMM) 1675$_1$-1675$_N$ that implement virtual system support to coordinate operations between hypervisor 1610 and corresponding VMs 1635$_1$-1635$_N$. Those with ordinary skill in the art will recognize that the various terms, layers, and categorizations used to describe the virtualization components in FIG. 16 may be referred to differently without departing from their functionality or the spirit or scope of the disclosure. For example, virtual hardware platforms 1640$_1$-1640$_N$ may also be considered to be separate from VMMs 1675$_1$-1675$_N$, and VMMs 1675$_1$-1675$_N$ may be considered to be separate from hypervisor 1610. One example of hypervisor 16810 that may be used in an example of the disclosure is included as a component in VMware's ESX brand software, which is commercially available from VMware, Inc.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing examples, VMs are used as an example for the containers and hypervisors as an example for the hardware abstraction layer. Each VM generally includes a guest operating system in which at least one application runs. It should be noted that these examples may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices. In some examples, the computing system environment includes a first computer system at a first site and/or a second computer system at a second site. The first computer system at the first site in some non-limiting examples executes program code, such as computer readable instructions stored on non-transitory computer readable storage medium.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for pooled memory heartbeat. For example, the elements illustrated in FIG. 1, FIG. 2, FIG. 3, FIG. 6, FIG. 7, FIG. 8, FIG. 15 and FIG. 16, such as when encoded to perform the operations illustrated in FIG. 10, FIG. 11, FIG. 12, and FIG. 13, constitute exemplary means for accessing a pooled memory heartbeat file on a shared partition in pooled memory, exemplary means for checking the heartbeat file, exemplary means for identifying an active pooled memory heartbeat status is the heartbeat file is locked, and exemplary means for identifying an inactive pooled memory heartbeat of a host if the pooled memory heartbeat file is unlocked.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for monitoring pooled memory heartbeats to determine host status, the method comprising:
   checking a heartbeat file stored in at least one shared partition on a pooled memory, the heartbeat file associated with a selected host in a plurality of host computing devices;
   on determining the checked heartbeat file is locked, identifying a pooled memory heartbeat status of the selected host as an active pooled memory heartbeat;
   on determining the checked heartbeat file is unlocked, identifying the pooled memory heartbeat status as an inactive pooled memory heartbeat, the inactive pooled memory heartbeat indicates the selected host has lost connection to the pooled memory;
   on determining a network heartbeat status for the selected host is active and the pooled memory heartbeat status is active, identifying the selected host as a normally operating host;
   on determining the network heartbeat status of the selected host is inactive and the pooled memory heartbeat status is active, identifying the selected host as a network isolated host; and
   on determining the network heartbeat status is inactive and the pooled memory heartbeat is inactive, identifying the selected host as a failed host.

2. The method of claim 1, further comprising:
   on determining a shared data store heartbeat status is active and the pooled memory heartbeat status is active, identifying the selected host as the normally operating host;
   on determining the shared data store heartbeat status of the selected host is inactive and the pooled memory heartbeat status is active, identifying the selected host as a host having lost storage connectivity; and
   on determining the shared data store heartbeat status is inactive and the pooled memory heartbeat is inactive, identifying the selected host as the failed host.

3. The method of claim 1, further comprising:
   on determining the network heartbeat status is active, a shared data store heartbeat status is active, and the pooled memory heartbeat status is active, identifying the selected host as the normally operating host; and
   on determining the network heartbeat is inactive, the shared data store heartbeat is inactive, and the pooled memory heartbeat is inactive, identifying the selected host as the failed host and respawning a set of virtual machines associated with the failed host on a different host.

4. The method of claim 1, further comprising:
   checking a shared data store heartbeat and a network heartbeat of the selected host to determine a shared data store heartbeat status and the network heartbeat status of the selected host;
   on determining the network heartbeat status is inactive, the pooled memory heartbeat status is active, and the shared data store heartbeat status is active, identifying the selected host as the network isolated host; and
   on determining the network heartbeat status is inactive, the pooled memory heartbeat status is active, and the shared data store heartbeat status is inactive, identifying the selected host as the network isolated host having lost storage connectivity.

5. The method of claim 1, further comprising:
   on determining the network heartbeat status is active, the pooled memory heartbeat status is active, and a shared data store heartbeat status is inactive, identifying the selected host as a host with lost storage connectivity;
   on determining the network heartbeat status is active, the pooled memory heartbeat status is inactive, and the shared data store heartbeat status is active, identifying the selected host as a host with lost pooled memory;
   on determining the network heartbeat status is active, the pooled memory heartbeat status is inactive, and the shared data store heartbeat status is inactive, identifying the selected host as a host with lost pooled memory and lost storage connectivity; and on determining the network heartbeat is inactive, the pooled memory heartbeat status is active, and the shared data store heartbeat is inactive, identifying the selected host as the network isolated host with lost storage connectivity.

6. The method of claim 1 further comprising:
iteratively updating a pooled memory heartbeat file at an occurrence of an update time interval to lock the pooled memory heartbeat file, wherein a failure to update the pooled memory heartbeat file within the update time interval unlocks the pooled memory heartbeat file.

7. A computer system comprising:
a memory device providing pooled memory accessible by a plurality of hosts, the pooled memory comprising at least one shared partition;
a processor; and
a non-transitory computer readable medium having stored thereon program code for monitoring pooled memory heartbeats to determine host status, the program code causing the processor to:
check a heartbeat file stored in at least one shared partition on a pooled memory, the heartbeat file associated with a selected host in a plurality of host computing devices;
on determining the checked heartbeat file is locked, identify a pooled memory heartbeat status of the selected host as an active pooled memory heartbeat;
on determining the checked heartbeat file is unlocked, identify the pooled memory heartbeat status as an inactive pooled memory heartbeat, the inactive pooled memory heartbeat indicates the selected host has lost connection to the pooled memory;
identify the selected host as a normally operating host on determining a network heartbeat status for the selected host is active and the pooled memory heartbeat status is active;
identify the selected host as a network isolated host on determining the network heartbeat status of the selected host is inactive and the pooled memory heartbeat status is active; and
identify the selected host as a failed host on determining the network heartbeat status is inactive and the pooled memory heartbeat is inactive.

8. The computer system of claim 7 wherein the program code further causes the processor to:
identify the selected host as the normally operating host on determining a shared data store heartbeat status is active and the pooled memory heartbeat status is active;
identify the selected host as a host having lost storage connectivity on determining the shared data store heartbeat status of the selected host is inactive and the pooled memory heartbeat status is active; and
identify the selected host as the failed host on determining the shared data store heartbeat status is inactive and the pooled memory heartbeat is inactive.

9. The computer system of claim 7 wherein the program code further causes the processor to:
identify the selected host as the normally operating host on determining the network heartbeat status is active, a shared data store heartbeat status is active, and the pooled memory heartbeat status is active; and
identify the selected host as the failed host and respawning a set of virtual machines associated with the failed host on a different host on determining the network heartbeat is inactive, the shared data store heartbeat is inactive, and the pooled memory heartbeat is inactive.

10. The computer system of claim 7 wherein the program code further causes the processor to:
check a shared data store heartbeat and a network heartbeat of the selected host to determine a shared data store heartbeat status and the network heartbeat status of the selected host;
identify the selected host as the network isolated host on determining the network heartbeat status is inactive, the pooled memory heartbeat status is active, and the shared data store heartbeat status is active; and
identify the selected host as the network isolated host having lost storage connectivity on determining the network heartbeat status is inactive, the pooled memory heartbeat status is active, and the shared data store heartbeat status is inactive.

11. The computer system of claim 7 further comprising:
a shared data store heartbeat, wherein the program code further causes the processor to:
identify the selected host as a host with lost storage connectivity on determining the network heartbeat status is active, the pooled memory heartbeat status is active, and a shared data store heartbeat status is inactive;
identify the selected host as a host with lost pooled memory on determining the network heartbeat status is active, the pooled memory heartbeat status is inactive, and the shared data store heartbeat status is active;
identify the selected host as a host with lost pooled memory and lost storage connectivity on determining the network heartbeat status is active, the pooled memory heartbeat status is inactive, and the shared data store heartbeat status is inactive; and
identify the selected host as the network isolated host with lost storage connectivity on determining the network heartbeat is inactive, the pooled memory heartbeat status is active, and the shared data store heartbeat is inactive.

12. The computer system of claim 7 further comprising:
a pooled memory heartbeat file in a shared partition in the memory, wherein the program code further causes the processor to iteratively update the pooled memory heartbeat file at an occurrence of an update time interval to lock the pooled memory heartbeat file, wherein a failure to update the pooled memory heartbeat file within the update time interval unlocks the pooled memory heartbeat file.

13. A non-transitory computer readable storage medium having stored thereon program code executable by a first computer system at a first site, the program code embodying a method comprising:
checking a heartbeat file stored in at least one shared partition on a pooled memory, the heartbeat file associated with a selected host in a plurality of host computing devices;
identifying a pooled memory heartbeat status of the selected host as an active pooled memory heartbeat, on determining the checked heartbeat file is locked;
identifying the pooled memory heartbeat status as an inactive pooled memory heartbeat on determining the pooled memory heartbeat file is unlocked, the inactive pooled memory heartbeat indicates the selected host has lost connection to the pooled memory;

on determining a network heartbeat status for the selected host is active and the pooled memory heartbeat status is active, identifying the selected host as a normally operating host;

on determining the network heartbeat status of the selected host is inactive and the pooled memory heartbeat status is active, identifying the selected host as a network isolated host; and on determining the network heartbeat status is inactive and the pooled memory heartbeat is inactive, identifying the selected host as a failed host.

14. The non-transitory computer readable storage medium of claim 13, wherein the program code embodying the method further comprises:

on determining a shared data store heartbeat status is active and the pooled memory heartbeat status is active, identifying the selected host as the normally operating host;

on determining the shared data store heartbeat status of the selected host is inactive and the pooled memory heartbeat status is active, identifying the selected host as a host having lost storage connectivity; and on determining the shared data store heartbeat status is inactive and the pooled memory heartbeat is inactive, identifying the selected host as the failed host.

15. The non-transitory computer readable storage medium of claim 13, wherein the program code embodying the method further comprises:

on determining the network heartbeat status is active, a shared data store heartbeat status is active, and the pooled memory heartbeat status is active, identifying the selected host as the normally operating host; and on determining the network heartbeat is inactive, the shared data store heartbeat is inactive, and the pooled memory heartbeat is inactive, identifying the selected host as the failed host and respawning a set of virtual machines associated with the failed host on a different host.

16. The non-transitory computer readable storage medium of claim 13, wherein the program code embodying the method further comprises:

checking a shared data store heartbeat and a network heartbeat of the selected host to determine a shared data store heartbeat status and the network heartbeat status of the selected host;

on determining the network heartbeat status is inactive, the pooled memory heartbeat status is active, and the shared data store heartbeat status is active, identifying the selected host as the network isolated host; and on determining the network heartbeat status is inactive, the pooled memory heartbeat status is active, and the shared data store heartbeat status is inactive, identifying the selected host as the network isolated host having lost storage connectivity.

17. The non-transitory computer readable storage medium of claim 13, wherein the program code embodying the method further comprises:

iteratively updating a pooled memory heartbeat file at an occurrence of an update time interval to lock the pooled memory heartbeat file, wherein a failure to update the pooled memory heartbeat file within the update time interval unlocks the pooled memory heartbeat file.

* * * * *